(12) United States Patent
Milic-Frayling et al.

(10) Patent No.: US 7,747,611 B1
(45) Date of Patent: Jun. 29, 2010

(54) SYSTEMS AND METHODS FOR ENHANCING SEARCH QUERY RESULTS

(75) Inventors: Natasa Milic-Frayling, Cambridge (GB); Brett D. Brewer, Sammamish, WA (US); Eric Watson, Redmond, WA (US); Eddie L. Mays, III, Renton, WA (US); Ralph Sommerer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 10/802,909

(22) Filed: Mar. 17, 2004

Related U.S. Application Data

(63) Continuation-in-part of application No. 09/578,302, filed on May 25, 2000, now Pat. No. 6,968,332.

(51) Int. Cl.
G06F 7/00 (2006.01)
G06F 17/30 (2006.01)
(52) U.S. Cl. ..................................... 707/722
(58) Field of Classification Search ................. 707/1–3, 707/10, 100, 102, 104.1, 722
See application file for complete search history.

(56) References Cited

U.S. PATENT DOCUMENTS

| | | | |
|---|---|---|---|
| 5,278,980 A | 1/1994 | Pedersen et al. | |
| 5,404,514 A | 4/1995 | Kageneck et al. | |
| 5,535,382 A | 7/1996 | Ogawa | |
| 5,727,129 A | 3/1998 | Barrett et al. | |
| 5,864,871 A | 1/1999 | Kitain et al. | |
| 6,029,195 A | 2/2000 | Herz | |
| 6,052,108 A | 4/2000 | Gadd | 707/110 |
| 6,055,542 A * | 4/2000 | Nielsen et al. | 707/104.1 |
| 6,101,503 A | 8/2000 | Cooper et al. | |
| 6,134,548 A * | 10/2000 | Gottsman et al. | 707/5 |
| 6,154,737 A | 11/2000 | Inaba et al. | |
| 6,233,586 B1 | 5/2001 | Chang et al. | |
| 6,275,820 B1 | 8/2001 | Navin-Chandra et al. | |

(Continued)

OTHER PUBLICATIONS

C. Olston and E.H. Chi. ScentTrails: Integrating Browsing and Searching on the Web. ACM Transactions on Computing, vol. 10 Issue 3, pp. 177-197, 2003.

(Continued)

Primary Examiner—John R. Cottingham
Assistant Examiner—Susan F Rayyan
(74) Attorney, Agent, or Firm—Shook, Hardy & Bacon LLP

(57) ABSTRACT

The present invention leverages search query result page thumbnails and/or search query result link content evaluations to provide user-dependent enhanced search query results. This provides a simplified means to inform a user of the relevancy of search query results based on the user's preferences, environment, and/or profile, etc. The present invention allows a user to more adequately determine the value of the search query result via search query result indicators within the thumbnail and/or in the proximity of a displayed result link. In one instance of the present invention, a thumbnail of a query result link is automatically displayed when the link is selected. This provides a means to view an entire search result page, eliminating the necessity of scrolling through each page to find relevant search terms. In another instance of the present invention, indicators are utilized to inform a user of the content of a search result link.

7 Claims, 26 Drawing Sheets

U.S. PATENT DOCUMENTS

| | | | |
|---|---|---|---|
| 6,356,908 B1 | 3/2002 | Brown et al. ............... | 707/110 |
| 6,360,235 B1* | 3/2002 | Tilt et al. ................... | 715/205 |
| 6,363,377 B1* | 3/2002 | Kravets et al. ............... | 707/4 |
| 6,369,811 B1 | 4/2002 | Graham et al. | |
| 6,405,192 B1 | 6/2002 | Brown et al. ................. | 707/3 |
| 6,408,294 B1 | 6/2002 | Getchius et al. | |
| 6,473,751 B1 | 10/2002 | Nikolovska et al. | |
| 6,473,752 B1 | 10/2002 | Fleming, III | |
| 6,654,735 B1 | 11/2003 | Eichstaedt et al. | |
| 6,665,838 B1 | 12/2003 | Brown et al. ............. | 715/501.1 |
| 6,693,651 B2 | 2/2004 | Biebesheimer et al. ...... | 715/837 |
| 6,728,706 B2 | 4/2004 | Aggarwal et al. | |
| 6,874,019 B2 | 3/2005 | Hamilton, II et al. | |
| 6,968,332 B1* | 11/2005 | Milic-Frayling et al. ....... | 707/3 |
| 2002/0165925 A1 | 11/2002 | Hamilton, II et al. | |
| 2003/0014501 A1* | 1/2003 | Golding et al. ............. | 709/218 |
| 2003/0023745 A1 | 1/2003 | Noe | |

OTHER PUBLICATIONS

Anton Leuski. Relevance and Reinforcement in Interactive Browsing. Proceedings of the 9th International Conference on Information and Knowledge Management, pp. 119-126, 2000.

P. Baudisch, B. Lee, and L. Hanna. Fishnet, a Fisheye Web Browswer with Search Term Popouts: a Comparative Evaluation with Overview and Linear View. Proceedings of the Working Conference on Advanced Visual Interfaces, pp. 133-140, 2004.

D. Knaus, et al.; "Highlighting Relevant Passages for Users of the Interactive Spider Retrieval System",. Swiss Federal Institute of Technology (ETH), 11 pages.

OA Dated Sep. 23, 2008, for U.S. Appl. No. 11/256,131, 34 pages.

OA Dated Aug. 22, 2008, for U.S. Appl. No. 11/255,512, 17 pages.

OA Dated Sep. 8, 2008, for U.S. Appl. No. 11/256,062, 24 pages.

OA Dated Jan. 27, 2009 for U.S. Appl. No. 11/255,512, 13 pages.

OA Dated Feb. 18, 2009 for U.S. Appl. No. 11/256,062, 22 pages.

* cited by examiner

FIG. 21

SYSTEMS AND METHODS FOR ENHANCING SEARCH QUERY RESULTS

REFERENCE TO RELATED APPLICATION(S)

This application is a continuation in part of U.S. patent application Ser. No. 09/578,302 which was filed May 25, 2000, now U.S. Pat. No. 6,968,332 entitled FACILITY FOR HIGHLIGHTING DOCUMENTS ACCESSED THROUGH SEARCH OR BROWSING, the entirety of which is incorporated herein by reference.

TECHNICAL FIELD

The present invention relates generally to search engines, and more particularly to systems and methods for enhancing search query results provided by a search service.

BACKGROUND OF THE INVENTION

The World Wide Web (WWW), often referred to as "the Web," is a global network that involves a vast quantity of data and numerous types of services aimed at accessing, organizing, and distributing that data. In particular, there are millions of documents on the Web and many on-line search services that enable the users to find documents that are of interest to them. Typically, documents on the Web are linked via hyperlinks, created by the authors of the documents, which enable the users to browse through documents on their own by following the links that interest them. The large quantity of the Web data and the fast rate of Web expansion have immanent implications on the ways the services on the Web can approach the problem of processing Web data.

Collecting and processing all or a majority of Web documents with an appropriate rate of updating the information that has been collected about these documents is often not feasible. Indeed, the processing power and the network bandwidth are not yet up to the task. However, there is also a more fundamental reason: because of the distributed nature of the data, the services are not in control of the document change— the authors of Web documents can change them at any time, as needed. That is why, among other reasons, search services do not deliver the document text in response to the user's query. The search services at best deliver the title and some type of summary of a document that is created by the search service based on the version of the document available at the time the document was collected and indexed. The search service points the user to the URL (uniform resource locator), i.e., the location of the document on the Web at the time the document was collected. It is up to the user then to execute the URL link and access the document text, which may or may not be the same as the text processed and summarized by the search service.

This lack of control over the content of documents on the Web requires new approaches in providing some of the basic and commonly provided document management features of traditional document management systems. Such features include: marking of the query terminology in the document text to help the user identify the portions of the text that talk about the desired topic, to assess the document relevance to the topic, etc.; summarizing document text to extract most salient sentences or query specific portions of the text; analyzing the text to identify and extract entities that may be of particular interest to the user, e.g., person names, company names, locations, etc., or relations among these entities; and creating various visual representations of the document to help with browsing through the document, assessing document relevance, etc. Since the documents on the Web are frequently accessed in a "browsing mode" by following the hyperlinks in the documents, the same type of document management support is needed for browsing among and through Web documents.

Furthermore, since the type and the quality of services on the Web vary, the users on the Web often need to explore which of them can best handle a particular request for information. For example, if the user is engaging a couple of search services to find certain types of documents, this often involves retyping the query in the appropriate search window of the individual search services. There is a need for a facility that can assist the user in specifying the user's information need and that creates various representations of that need suitable for interfacing with various Web services.

It is highly desirable to provide the user with the facilities for obtaining better information regarding the relevancy of documents pointed to by various services on the Web or accessed by browsing the Web documents, including providing such information based on the current versions of the documents. It is also desirable to provide the user with a consistent manner in which such relevancy is identified regardless of the way the document is accessed (based on a Web service information or browsing or the combination of), providing a rich representation of the user's information need.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to search engines, and more particularly to systems and methods for enhancing search query results provided by a search service. Search query result page thumbnails and/or search query result link content evaluations are leveraged to provide user-dependent, enhanced search query results. This provides a simplified means to inform a user of the relevancy of search query results based on the user's preferences, environment, and/or profile, etc. By providing enhanced search query result information, the present invention allows a user to more adequately determine the value of the search query result via search query result indicators within the thumbnail and/or in the proximity of a displayed result link. In one instance of the present invention, a thumbnail of a query result link is automatically displayed when the link is selected. This provides a means to view an entire search result page, eliminating the necessity of scrolling through each page to find relevant search terms. The thumbnail utilizes search query result indicators to relay relevant information to the user when the thumbnail is shown. The search result indicators, such as highlighting and/or outlining of relevant terms and the like, allows the user to quickly assess density of desired search terms. In other instances of the present invention, color indicators, such as hue and/or intensity, are employed to indicate closeness of a desired match of all search terms and/or relevancy of a search query result link. Thus, the present invention significantly enhances the relaying of search result information to a user, providing an efficient and quick means to assess search query results.

To the accomplishment of the foregoing and related ends, certain illustrative aspects of the invention are described

BRIEF DESCRIPTION OF THE DRAWINGS

FIG. 21 is a screen shot illustrating a thumbnail view of a selected search query result link for an enhanced search query results user interface in accordance with an aspect of the present invention.

DETAILED DESCRIPTION OF THE INVENTION

Figure 1:
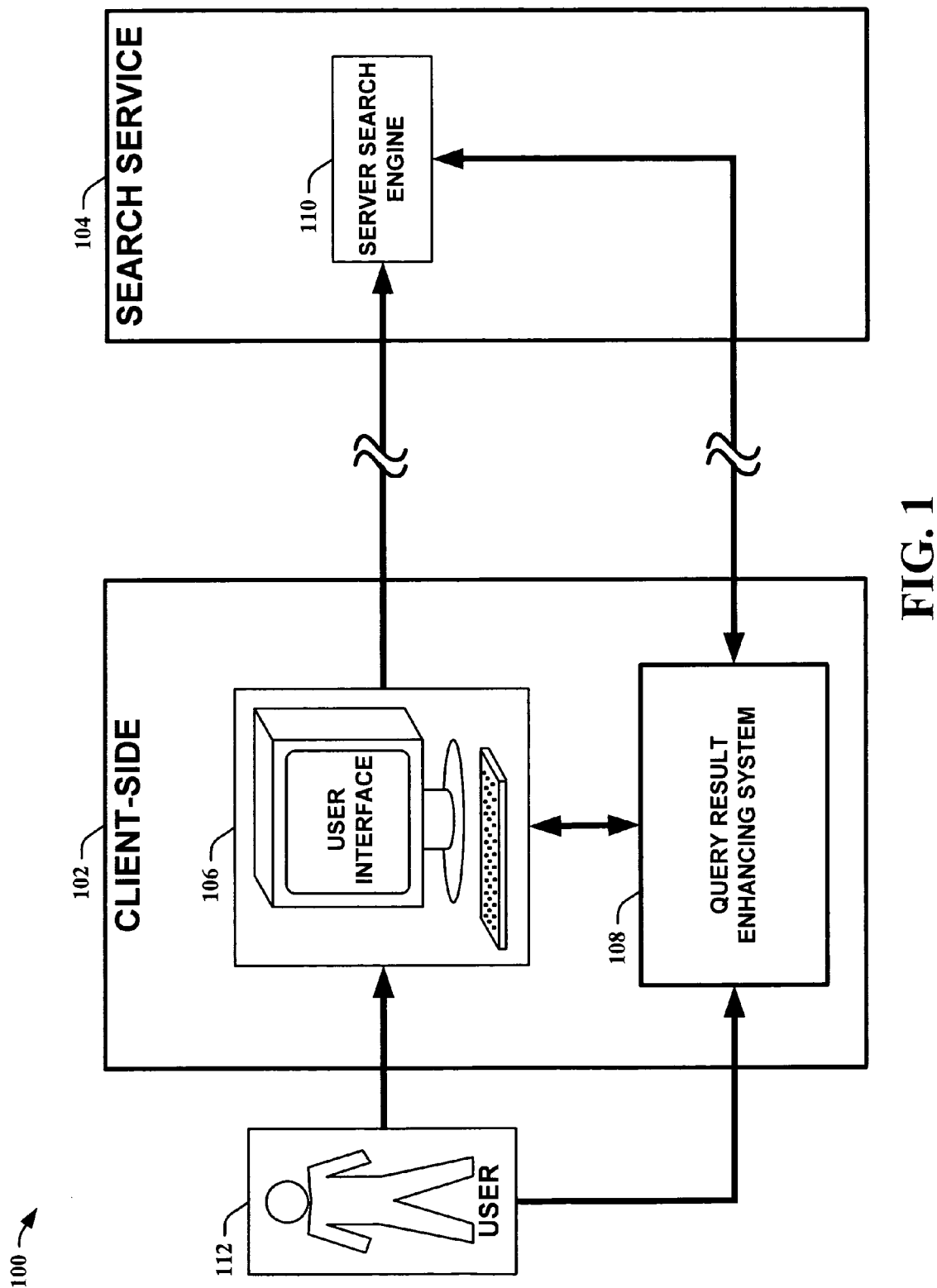
FIG. 1 is a block diagram of a query result enhancing system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention employs knowledge relating to a user to enhance search query results. A user's profile, environment, and/or desired search rules and the like are utilized to increase the utility and value of the search query results. These user-dependent attributes facilitate a search term visualization scheme and a search query result link evaluation scheme. A typical search process sends a query to a search service generally located at a remote server. The server responds back with a list of links and possibly excerpts from their associated pages. However, the present invention intervenes in the process and enhances the returned results on the client-side. This localization of processing allows the present invention to utilize a user's relevant state and desired rules to tailor the search query results for that particular user. This includes such information as the context of the user, user profile data utilized by the system running the process, and/or user established search rules/guidelines directly entered by the user and/or gleaned from previous habits/searches and the like.

Given computer screen sizes and resolutions, it is common for some search terms found on a search result page to be located out of view, making it hard for users to determine relevance through visually scanning for search terms. One instance of the present invention provides a thumbnail of the page in order to allow the user to see the whole page in one view, permitting easy dissemination of relevant search term locations. The marking of search terms can be accomplished with highlighting with color and/or encircling and the like. This gives the user a simple visualization of the density of search terms on a page. One instance of the present invention automatically displays the thumbnail when a search query result link is selected (e.g., directly clicking and/or hovering in the proximity of a link, etc.).

Often when search query results are returned, they are listed as links with a short description or excerpt following. It is usually difficult to tell if the link actually contains text or is a portal to other webpages without any significant content. One instance of the present invention employs a means to evaluate the search query result links and display an indication of their contents to the user. This can include visual cues, such as arrows next to the link indicating a link-content link and/or a small document cue indicating a text-content link and the like. Thus, the present invention provides a significant improvement in quickly relaying information regarding search query results to users.

In FIG. 1, a block diagram of a query result enhancing system 100 in accordance with an aspect of the present invention is shown. The system 100 is comprised of a client-side system 102 that interfaces with a search service 104 and a user 112. The search service 104 can be comprised of a server search engine 110 and the like. The search service 104 provides search query processing. The client-side system 102 is comprised of a user interface 106 and a query result enhancing system 108. The query result enhancing system 108 receives information regarding the user 112 from a system within it operates and/or the user 112 directly. Thus, the query result enhancing system 108 is aware of user-dependent information that the search service 104 is not privy to. This enables the query result enhancing system 108 to enhance query results relayed to the user 112. In brief, the user 112 inputs a query via the user interface 106 which is sent to the search service 104 (server search engine 110 in this illustration). The search service 104 returns query results which are received by the query result enhancing system 108. The query result enhancing system 108 then processes the query results by employing user-dependent information to enhance their quality and presentation to the user 112 via the user interface 106. Although illustrated separately, the query result enhancing system 108 and the user interface 106 can be one component. It is also within the scope of the present invention to interface with a search service 104 that resides on the client side.

Figure 2:
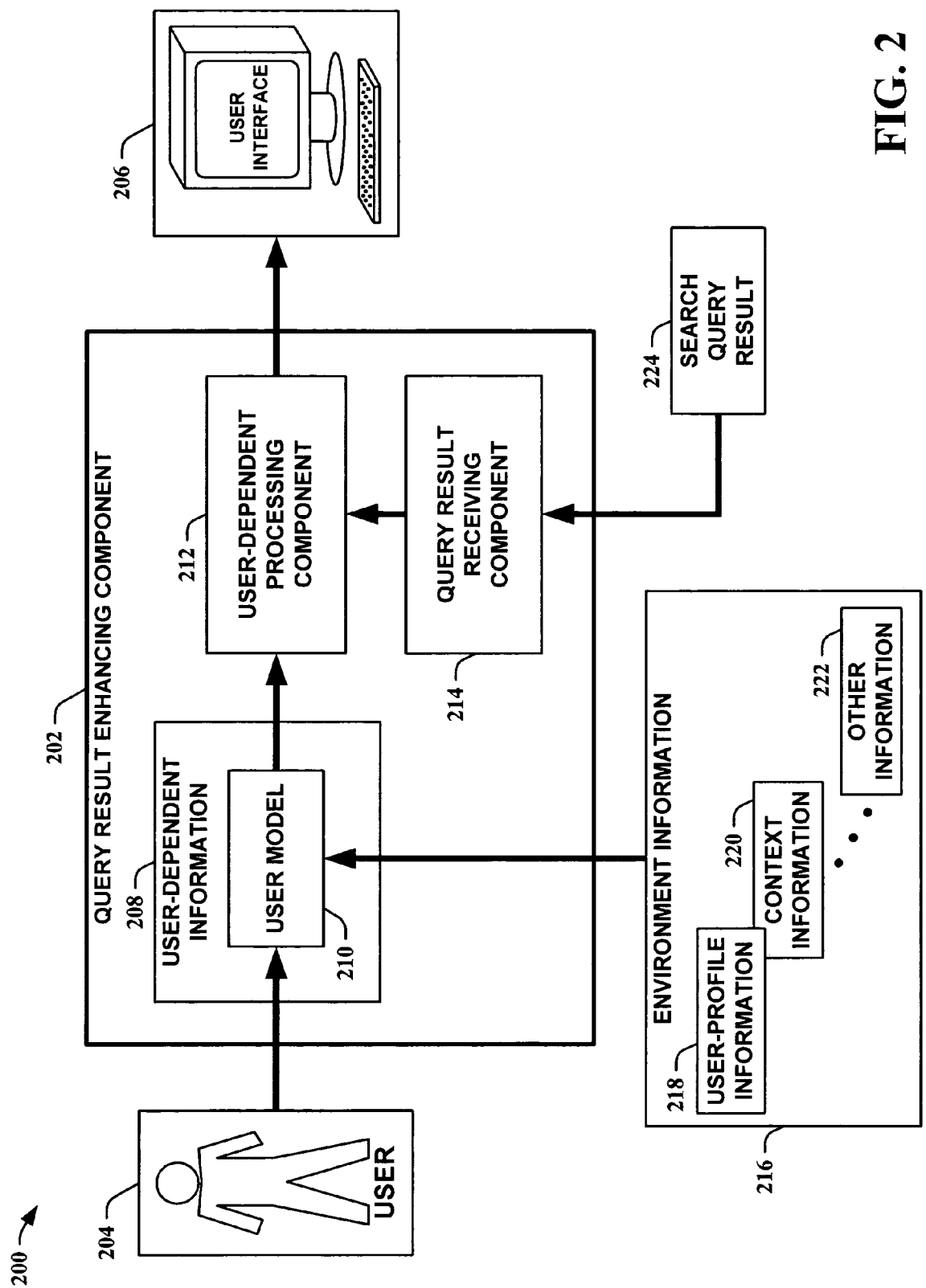
FIG. 2 is another block diagram of a query result enhancing system in accordance with an aspect of the present invention.

Referring to FIG. 2, another block diagram of a query result enhancing system 200 in accordance with an aspect of the present invention is depicted. The query result enhancing system 200 is comprised of a query result enhancing component 202 that interfaces with a user 204 and a user interface 206. The query result enhancing component 202 is comprised of a user-dependent information component 208, a user-dependent processing component 212, and a query result receiving component 214. The user-dependent information component 208 is comprised of, in this instance of the present invention, a user model 210. The user model 210 accepts data directly from the user 204 and/or obtains environment information 216. In this example, the environment information 216 is comprised of user-profile information 218, context information 220, and other information 222. The user-profile information 218 generally consists of information obtained from a system profile for the user 204 and/or information derived from previous actions and/or habits of the user 204. The context information 220 can include, but is not limited to, such data as when a search was requested, what programs are running, and/or whether the user 204 is available (e.g., user in a hurry, user on phone, user absent, detection of user talking with others, etc.). One skilled in the art can appreciate that many user-dependent factors can be utilized to enhance search query results. One example can be a detection that the time of day is near 1 pm and the user 204 is searching for "restaurants." If the user 204 typically eats at 11 am each day, the query result enhancing component 202 could assume that the user 204 is very hungry and only display localized search query results based on the user's location information so that the user 204 can quickly pick one and head to the restaurant without wading through a substantial number of result links. Since the types and contents of search queries are near infinite, all possible relevant user-dependent information utilized by the query result enhancing component 202 cannot be explicitly detailed here. Thus, other information 222 represents information not expressly elaborated on. Similarly, the user 204 can directly input information into the query result enhancing component 202. Such information can include searching rules, additional user information such as likes and dislikes, for example, and/or even photographic input information that is utilized to derive information indirectly from the user input.

Once the user-dependent information component 208 has obtained relevant user data, it is supplied to the user-dependent processing component 212. This data, along with search query result data 224 obtained by the query result receiving component 214, is processed to provide enhanced query results that are relayed to a user via the user interface 206. The processing provided by the user-dependent processing component 212 can include, but is not limited to, determining quality levels of results, highlighting results, and/or evaluating result links for content such as link content and/or text content and the like. In this manner, a user-dependent, simplified visualization is provided to a user to enhance the user's query results.

One skilled in the art can appreciate that relaying the desired information can be accomplished in various "sensory" means. Visual indicators, aural indicators, and/or even touch/vibratory indicators and the like can be utilized within the scope of the present invention. For example, a visually impaired person utilizing the present invention might be receiving aural commands and text reading, and, thus, can receive an aural indicator pertaining to density of terms, location of terms, and/or relevancy and the like.

Figure 3:
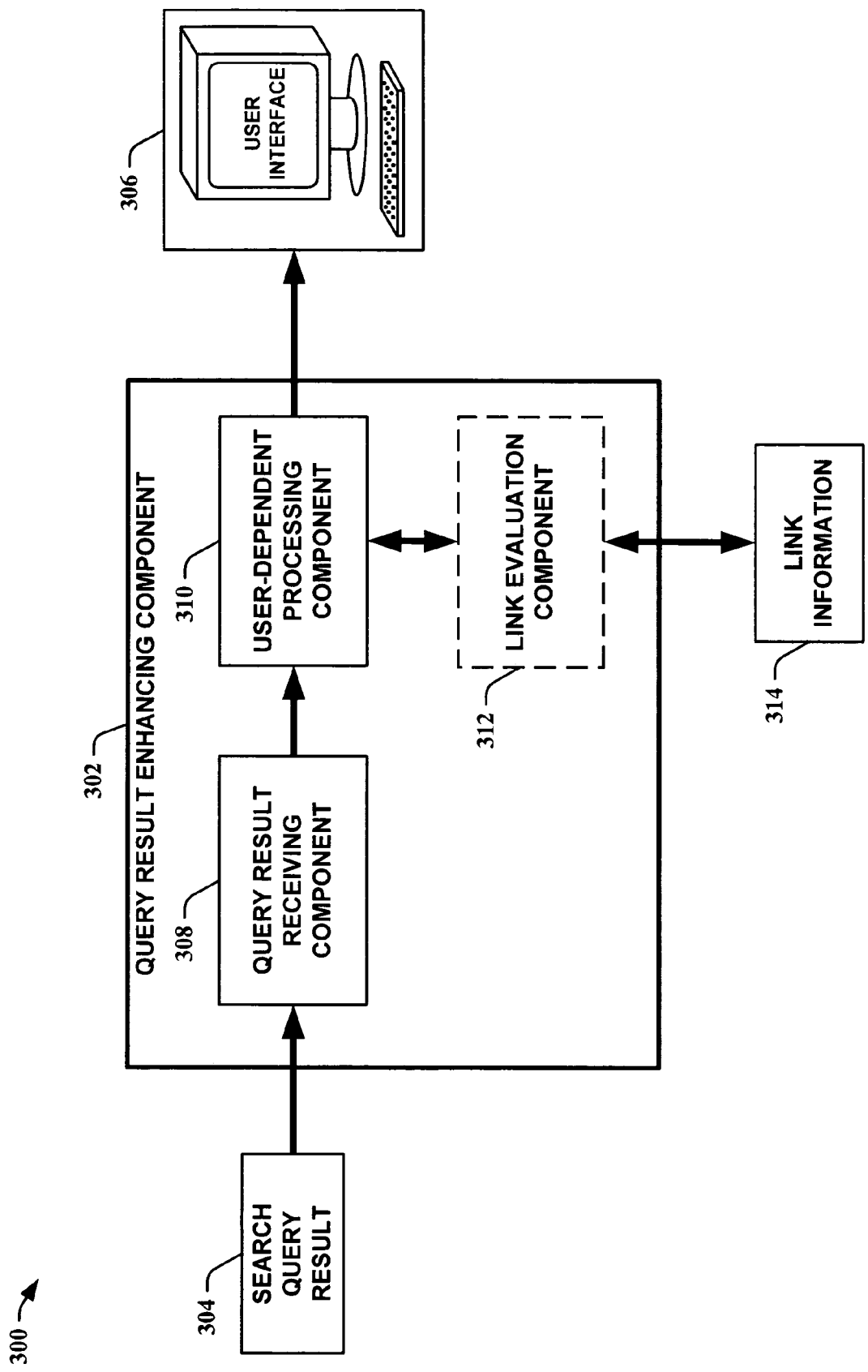
FIG. 3 is yet another block diagram of a query result enhancing system in accordance with an aspect of the present invention.

Turning to FIG. 3, yet another block diagram of a query result enhancing system 300 in accordance with an aspect of the present invention is illustrated. The query result enhancing system 300 is comprised of a query result enhancing component 302 and a user interface 306. The query result enhancing component 302 is comprised of a query result receiving component 308, a user-dependent processing component 310, and an optional link evaluation component 312. The query result receiving component 308 receives search query result data 304 and inputs it into the user-dependent processing component 310. The user-dependent processing component 310, in this instance of the present invention, sends the search query result data 304 to the optional link evaluation component 312. The link evaluation component 312 processes the search query result data 304 and, if necessary, retrieves auxiliary link information data 314. In this manner, the link evaluation component 312 can determine if the content of a result link is text and/or links. The present invention can also determine a percentage of links and/or text for a given search query result link and/or utilize user-dependent data to eliminate such result links that do not surpass a given threshold relative to the user. Once the appropriate level of evaluation is completed, the information is sent to the user-dependent processing component 310 which employs the information when necessary/requested via the user interface 306.

Figure 4:
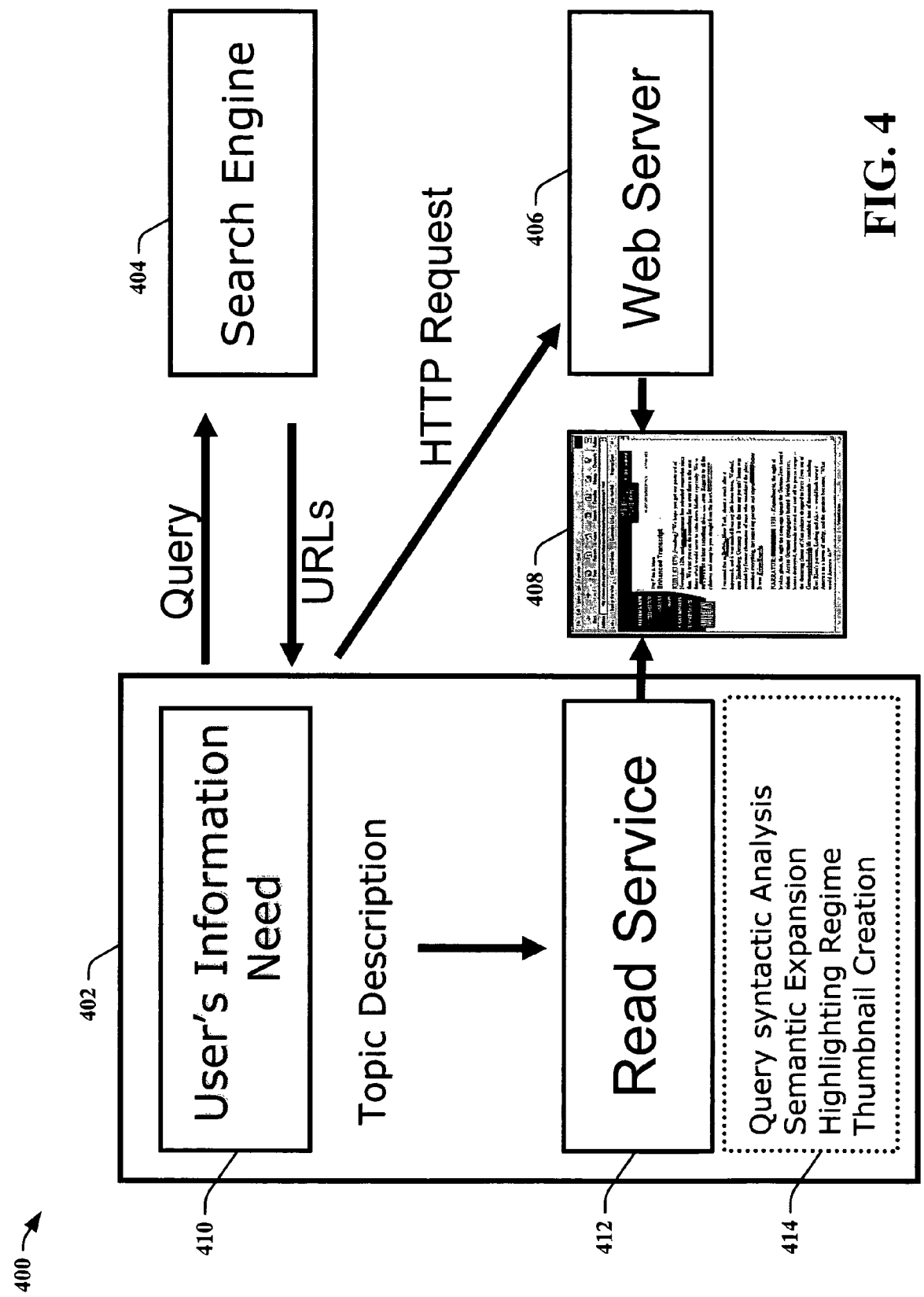
FIG. 4 is a block diagram illustrating a search query related information flow structure in accordance with an aspect of the present invention.

Turning to FIG. 4, a block diagram illustrating a search query related information flow structure 400 in accordance with an aspect of the present invention is shown. The flow structure 400 is comprised of a client-side system 402, a search service 404 (i.e., search engine), and a web page server 406 that produces a web page 408. The client-side system 402 is comprised of user's information need data 410, a read service 412, and read service functions 414. A query originates from the client-side system 402 in response to the user's information need 410. The search service 404 processes the search query and returns search query results such as URLs (uniform resource locators) and the like. The client-side system 402 then sends the search query results to the read service 412 which performs functions 414 as required. An HTTP (hyper-text transfer protocol) request is sent to the web server 406 to initiate displaying the web page 408 to a user. The read service then produces an enhanced version of the web page 408 originally produced by the web server 406. The enhanced version can include, but is not limited to, a thumbnail representation of the web page 408, presented as a substitute for or in proximity of and/or within the web page view, highlighting of search terms within the enhanced web page, and/or indications of the content of links within the web page 408.

Figure 5:
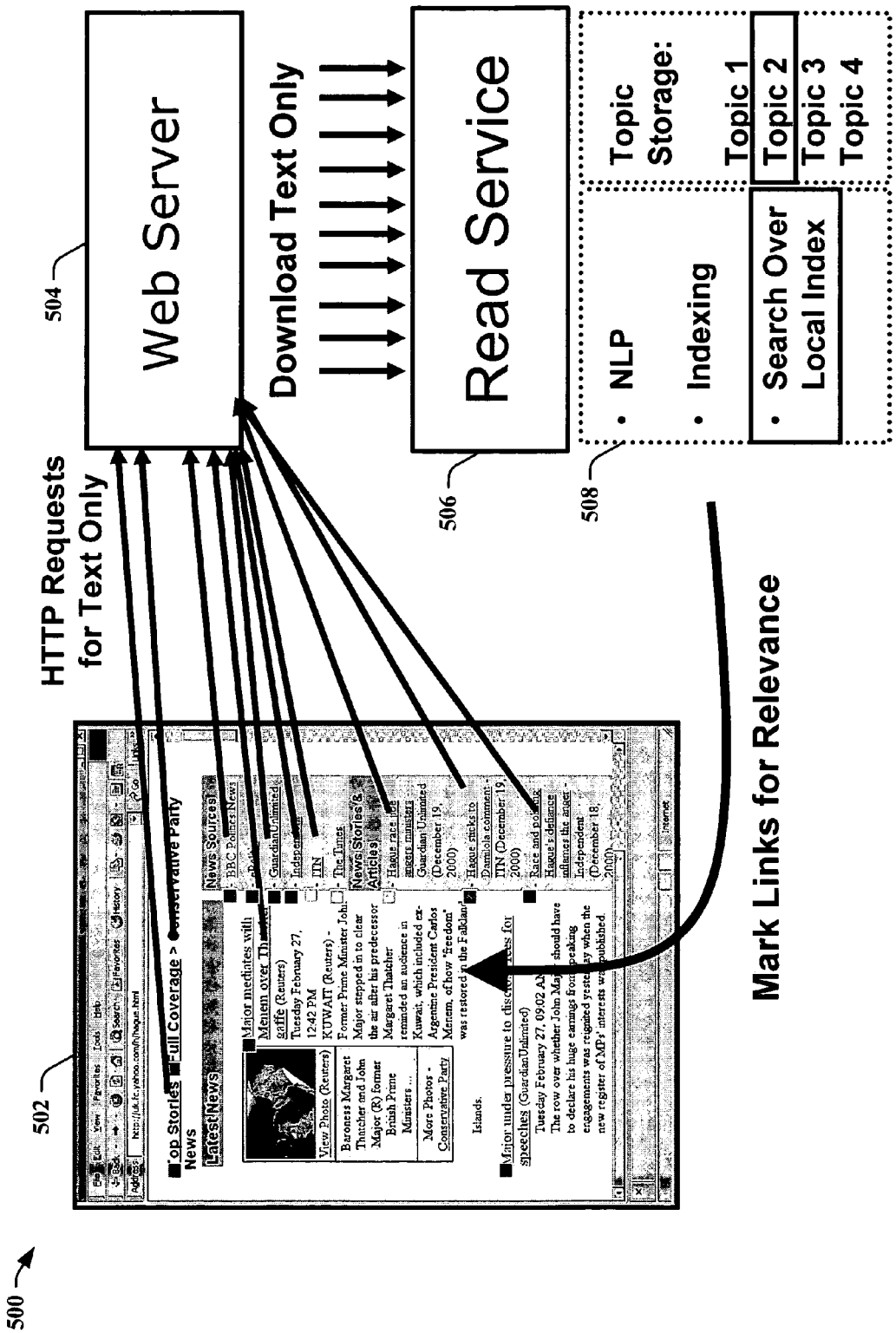
FIG. 5 is a block diagram illustrating search query link evaluation information flow structure in accordance with an aspect of the present invention.

In FIG. 5, a block diagram illustrating search query link evaluation information flow structure 500 in accordance with an aspect of the present invention is depicted. The flow structure 500 is comprised of a web page 502, a web server 504, and a read service 506 with read functions 508. Text only requests are sent to the web server 504 for links found within the web page 502. The web server 504 then downloads the text related to the links to the read service 506. The links are then processed by the read service 506 utilizing the read functions 508 as appropriate. The links within the web page 502 are then marked for relevance via an indicator to enhance the original web page 502.

Figure 6:
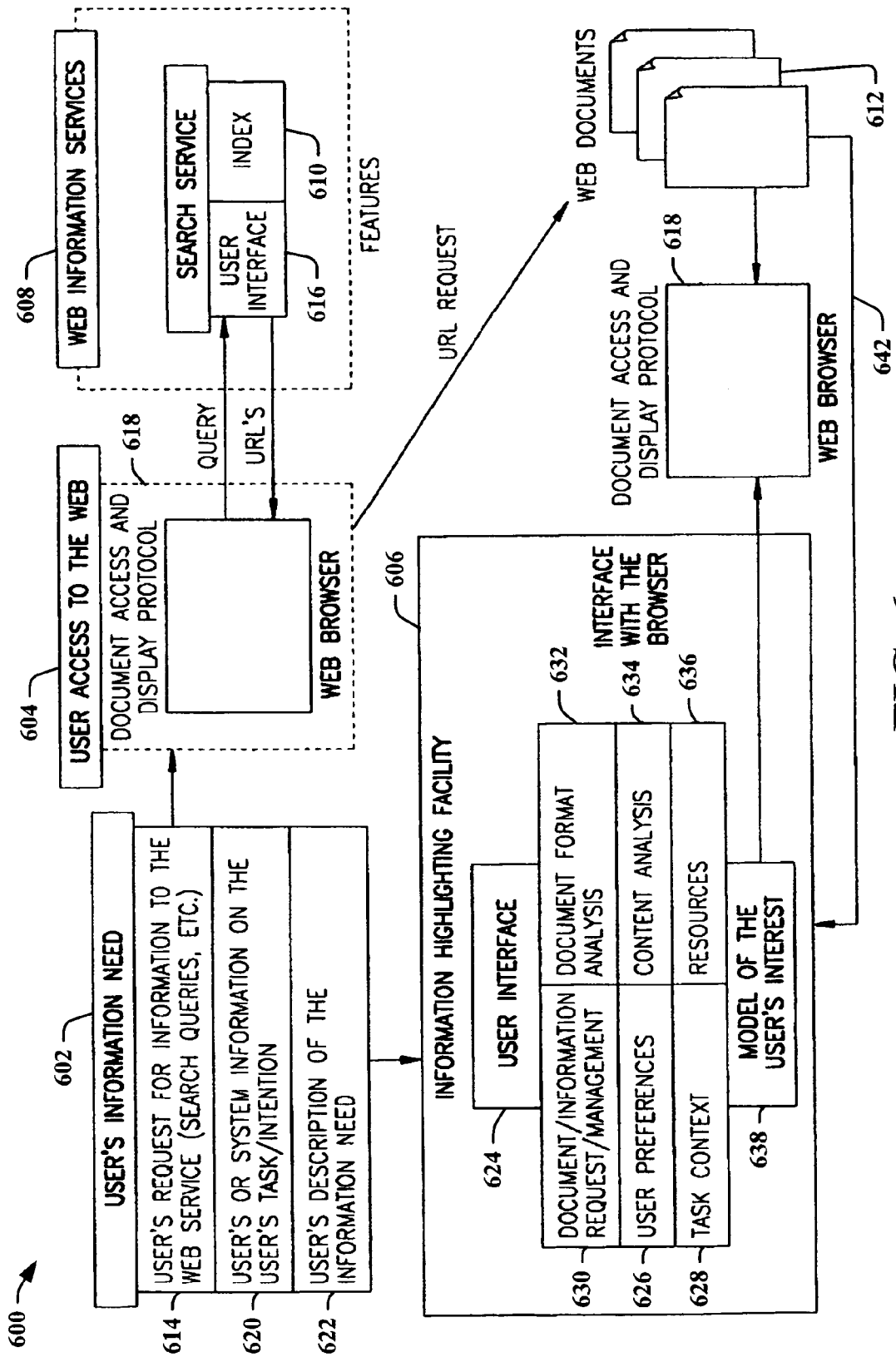
FIG. 6 is a block flow diagram showing interaction of the present invention with a Web based information service (e.g., a search engine) and browser.
Figure 7:
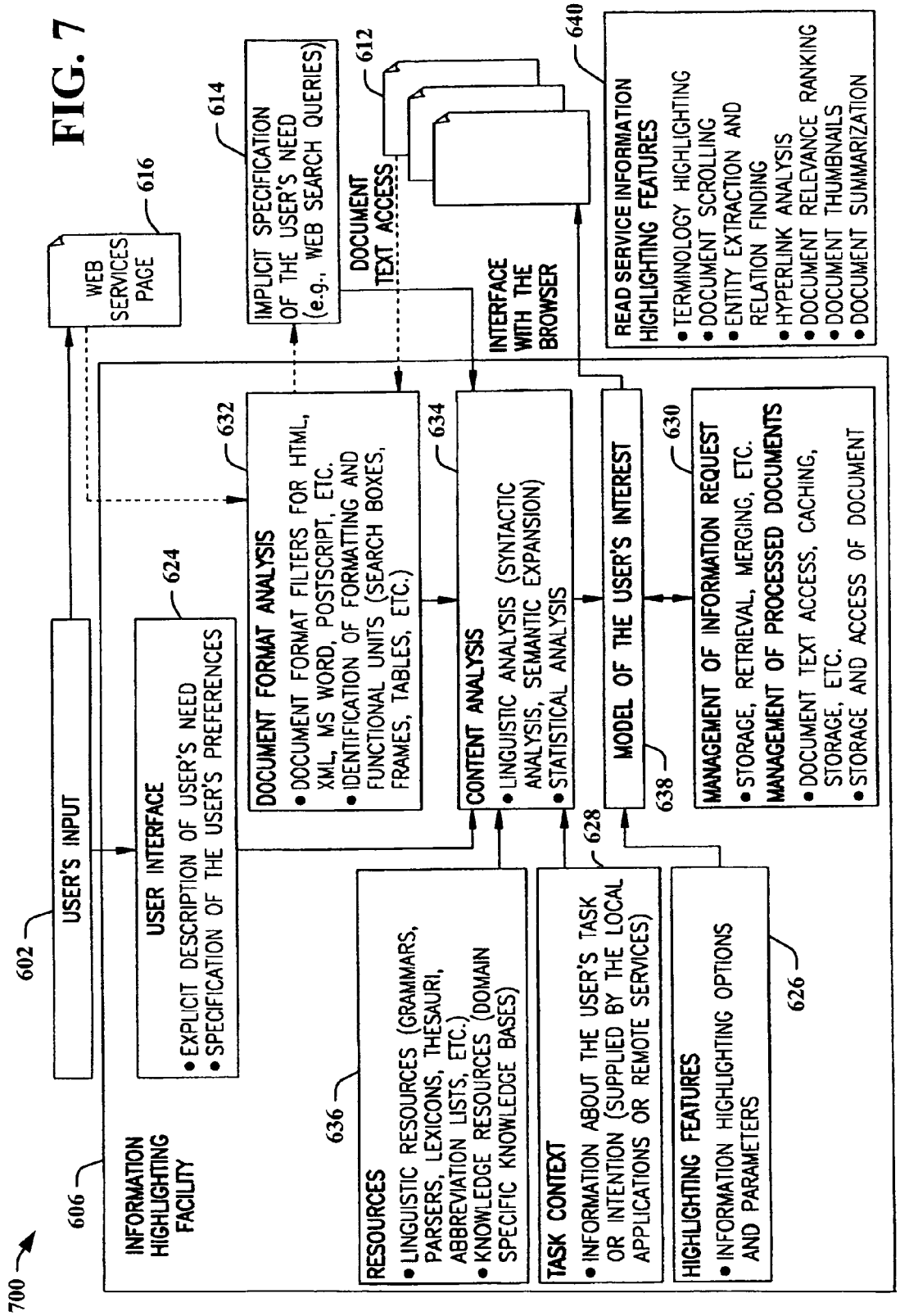
FIG. 7 is a block flow diagram of a service for creating a model of the user's interest and management of documents and document requests.

A more detailed explanation of the enhancing techniques is given as follows. A block flow diagram of operation of the present invention is shown in FIG. 6 generally at 600. An information highlighting facility is designated as Information highlighting facility 606 as shown in FIG. 6 and FIG. 7. The term highlighting facility refers to multiple functions used to highlight the relevancy of one or more documents as described below. It is not meant to be a term that refers only to the common function of highlighting text. The information highlighting facility also includes a document analysis facility to analyze documents prior to applying highlighting functions.

A user's information need is represented at 602 in FIG. 6. The need is communicated to a means of accessing the web, such as a web browser 604, and to a information highlighting facility 606. The information highlighting facility 606 creates a model of the user's information need that is more or less independent of the expression of the user's information need that is communicated by the user to a particular information providing service 608 (e.g., search engines on the Web). The information providing service 608 also comprises an index 610 that identifies documents 612 by means of an address or URL from which a web browser 618 may retrieve and display documents. Documents may also be provided directly to the information highlighting facility 606.

Input to the information highlighting facility 602 can be, for example, a single query or a set of queries 614 communicated by the user to the Web information providing service 608 (e.g., queries to a search engine). These queries are in one instance of the present invention captured from the Web page of a search engine at the time the user types a query into the search box provided by a user interface 616. This is referred to as an implicit characterization of the user's information need since it was not directly communicated to the information highlighting facility 606, but rather captured by the information highlighting facility 606 by monitoring the user's actions. Similarly, the system used by the user can monitor user's actions and provide information on the task the user is performing 620 (e.g., working on a report, sending an e-mail message, etc.) as a context for the information highlighting facility analysis to create the model of the user's information need.

In another instance of the present invention the information highlighting facility provides a query box that serves the purpose of specifying the query. The specified query is then sent (copied and pasted, dragged and dropped) to the search box 616 of a desired search engine. The user is then not required to retype the query when changing from one search engine to another.

Another, more explicit way of providing information highlighting facility 606 with the characterization of the user's need is by using a user's specification of the task and intentions at 620 (for example, in a form of a dialogue with information highlighting facility 606) and/or the user's detailed description of the information need at 622 (a direct input to information highlighting facility 606). Note, parts or all of the full description of the user's need are then useable for communicating with a particular information providing service (e.g., a search engine to information directory on the Web).

Information highlighting facility 606 is provided with a GUI 624 (graphical user interface) that enables direct input from the user. In particular, the user may specify a desired type of information highlighting facility 606 analysis that should be applied to the viewed documents, with details on the parameters to be used in the analysis (when required) and preferences on the display of results as indicated at 626. Furthermore, the user may provide information on a particular task the user is currently performing as represented at 628 to ensure that the analyses are context sensitive when applicable.

Information highlighting facility 606 contains a module 630 for managing past requests for information analysis (e.g., storing, retrieving, concatenating queries and information need descriptions) and/or documents that have been downloaded and analyzed. Information highlighting facility 606 analyses typically involve three components: format recognition and analysis module 632, content analysis 634 (e.g., linguistic and statistical analysis of the text), and resources 636 required for the analyses (e.g., linguistic and knowledge resources for identifying company names in the text).

The user specifies the information need 602 to information highlighting facility 606 directly and/or indirectly by communicating it to the Web information providing service 608. The system or the user may also provide information on a task that the user is currently performing. The user also specifies the type of information highlighting facility analysis that should be performed on the accessed documents.

This request for information is communicated via Web browser 618 to the information providing service. As a result, the user is provided with URL's and perhaps some additional information about documents that potentially satisfy the user's information need. For example, in case of Web search engines, the result of a search is typically a ranked list of document titles with short summaries and URL's. Based on the task context 628 and the specification of the user's information need, information highlighting facility 606 creates a model of the user's information need represented at 638.

FIG. 7 provides further information about the process flow 700 of the invention. The numbering of modules is consistent with FIG. 6. Information highlighting facility 606 provides several features to enhance or highlight documents as indicated at 640. Such features may include terminology highlighting, document scrolling, entity extraction and relation finding, hyperlink analysis, document relevance ranking, document thumbnails, and document summarization.

As an example of the process flow, if the user desires to have relevant terminology from the information request highlighted in the accessed documents, information highlighting facility 606 processes the request for information using linguistic analysis tools 634 and knowledge resources 636 to create a rich model 638 of the topic of interest. For example, it may perform synonym expansion of the original terms in the information request to ensure that relevant information is highlighted in the document without the need for the user to try to anticipate the linguistic variations in which the topic is described in the text.

As the user accesses a document, the model of the user's information need is used in the analysis of the document. For example, terminology highlighting is achieved by detecting in the document text (e.g., pattern matching) the terminology from the rich linguistic representation of the user's information need created by information highlighting facility 606. The user can specify various parameters related to terminology highlighting at 626. For example, the user may prefer to have terminology from the original description of the information need highlighted in one color while all the synonyms in some other color. Or, perhaps, the user may want only the occurrence of multi-word phrases from the request highlighted in the document, etc.

Some types of information highlighting facility analysis may require pre-fetching the document text in the background as the user is performing other tasks, e.g., viewing the result list from the search engine. For example, suppose that the user requested that thumbnail images of documents that were indicated by the search engine be displayed with query terminology highlighted in them. In that case, the text of documents from the search result page being viewed by the user could be downloaded in the background as represented by communication line 642 (see, FIG. 6), analyzed for query terminology and document layout and the highlighted thumbnail images would be displayed.

Similarly, suppose that the user requested an alternative ranking of the search result based on the rich information highlighting facility representation of the user's need (as opposed to the short query that the user may have communicated to the search engine). The document text of some selected documents (e.g., top N ranked documents) could be pre-fetched in the background, linguistically and statistically processed, and compared with the information highlighting facility 606 model of the user's interest. The documents would be scored and alternative ranking of them presented to the user.

Many of the information highlighting facility 606 analyses could be equally applied to the documents accessed as the user is browsing through the documents. Information highlighting facility 606 may be implemented as a local service on the user's desktop or as a remote service, or can be a combination of the two. For example, some information highlighting facility 606 analyses could employ the locally available resources (e.g., thesauri or knowledge base that the user may have available locally). When applied as a remote service (and thus used by a number of users), information highlighting facility 606 could benefit from the information it may store on the user community. For example, it may store some types of analysis of documents that have been performed as a result of the users' requests within a certain period of time (e.g., an hour, or a day, etc.). For example, if a user A requested that the accessed documents be analyzed for company names and person names, information highlighting facility 606 can perform this analysis and store the analysis results. When a user B accesses the same document and asks for the same analysis, the results could be delivered without repeating the document analysis (and thus saving the processing time).

As indicated above, information highlighting facility 606 captures information about the user's need. This can be done, in one instance of the present invention, based on the queries that the user issues to the Web search engines or different Web services at the service Web site. It can also be based on the user's description of the user's interest or information need communicated directly to information highlighting facility 606 through the information highlighting facility interface 624. Furthermore, the information highlighting facility 606 may make inferences or collect from the user explicitly (e.g., through a dialog) information about the user's task or intentions or preferences about the characteristics of documents (e.g., format of the documents that the user wants to access or avoid) or similar.

Based on the collected information, the information highlighting facility 606 builds the representation or model of the user's interest. This model then provides a context for analysis and information highlighting of any document accessed by the user. In one instance of the present invention, these are the documents downloaded from the Web. However, information highlighting facility 606 can be extended with components that recognize formats of documents from various sources (e.g., documents created by applications running locally on the user's desktop, documents delivered via e-mail, etc.). All information highlighting facility 606 features could then be applied to the content of those documents and the results displayed appropriately. Users may access documents by directly executing a URL of the desired document via the browser 618 or may follow a hyperlink in the currently viewed document or may select to access documents from a list of URLs presented to the user by a Web service (search service or others) as a result of the user's request for information.

As the documents are downloaded by the browser 618, they are processed by the information highlighting facility 606 in view of the model of the user's interest. The results of the information highlighting facility 606 processing are then displayed appropriately to the user. Information highlighting facility 606 may include a number of different features and supporting analyses comprising but not limited to: marking of terminology in the text, scrolling to the relevant passages in the document, extracting specified entity names and relations among entities in the text, summarizing documents by selecting sentences salient to the content of the document, or related to the query, etc., ranking documents in a designated document set with respect to the information highlighting facility 606 representation of the user's need, analyzing hyperlinks in the viewed documents with respect to the user's need, and creating various visual representation of the documents, such as thumbnail document images with highlighted information in the document text and hyperlinks to support reading of and browsing through the document text. The information highlighting facility 606 provides support for storing and managing various models of the user's interests. In particular, it enables the user to select which of the existing models or combination of the existing models should be used as the context for the analysis of documents.

If the user wishes to engage a search or similar Web services for information seeking, the user's queries or parts of the comprehensive information highlighting facility 606 model of the user's interest 638 are sent via the browser 618 for processing by the service 608. The user interface 616 running on the service end receives queries and performs the search operation over the documents that have been collected and processed by the service. Typically the services store information about the documents, including the document URL (uniform resource locator) in the form of index 610. As a result of the query processing, document identifiers, such as URLs, are retrieved from the index and typically ranked in relevance to the queries. The URLs are sent back to the client.

In one instance of the present invention, the user's interest model is generated by analyzing the query terms as entered by the user in 616. This may involve creating an augmented set of search terms based on syntactic analysis and semantic expansion of the user's query. The information highlighting facility 606 then provides highlighting of the original and expanded query terminology in the documents accessed upon the user request (via document identifier, the URL). Furthermore, the information highlighting facility 606 may use information about the wider context, e.g., the user task or user's explicit preferences to perform the terminology highlighting appropriately. For example, to support more efficient reading of the document, information highlighting facility 606 may perform selective terminology highlighting in the text by highlighting only key concepts from the user's interest model in the paragraphs that are assessed as most relevant to the user's need.

In one instance of the present invention, the information highlighting facility 606 receives the list of URLs from the search engine or other Web service and begins to download documents 612 identified via browser 618 in the background (while the user is performing other tasks, like reading the result list, etc.) in order to perform the linguistic and statistical analysis of the document texts. A read service then re-ranks the documents with respect to their relevance to the user's interest model, a more comprehensive representation of the user's interest than the one presented by the user to a search or some other Web service 608.

In one instance of the present invention, information highlighting facility 606 performs document analysis without a need for downloading and analyzing the document text in advance or in the background. This is done based on simple text analysis that requires no significant overhead in the processing time than it is required to download and display the document. In still a further instance of the present invention, other document analysis can be performed in the background as represented by line 642. This analysis may be more involved and require each document to be downloaded. Both approaches can be used to support entity extraction and relation finding, document summarization, etc.

In the case that the user engages in browsing through Web documents, the user can either specify an existing context, i.e., a model of the user's interest or need that information highlighting facility 606 created previously or can initiate a creation of the new one by providing information to the information highlighting facility 606 in various forms, including but not limited to a description of a particular topic interest, preferences, intentions and purpose of the browsing task, etc. Information highlighting facility 606 then creates the appropriate user's interest model as described above and applies them to the documents as the user browses the Web. In one instance of the present invention, the information highlighting facility 606 downloads in the background the documents that are pointed to by the hyperlinks in the currently viewed document. These documents are analyzed with respect to the current model of the user's interest. The result of the analysis is information to the user about the relevance of the hyperlinks and suggestion for further steps in browsing. In other instances of the present inventions, the hyperlink analysis is performed by the information highlighting facility 606 based on the text in the current document that surrounds the hyperlinks, thus without the need to download the linked documents in the background.

Analyses performed by the information highlighting facility 606 can be performed locally, using the local information resources as needed (linguistic resources such as lexicons, dictionaries, knowledge base, etc.) or remotely or as a combination of the two. The types of analyses include but are not limited to:

Terminology marking. When a document is downloaded, the terminology describing the user model can be highlighted, for example, by making keywords and key phrases bolder than the surrounding text, or by changing the background color to facilitate easier spotting in the text. In one instance of the present invention, this type of terminology marking can be done at the time the document is downloaded. In another instance of the present invention, a more sophisticated terminology marking is provided by pre-fetching and analyzing the document text in the background (e.g., while the user is performing other tasks, such as reading the document titles in the result sets of the search engines).

Scrolling. When a document is downloaded, it can be scrolled, for example, to the most relevant portion of a multi-page document. This can be done, for example, by statistical and linguistic analysis of the text that involves scoring individual paragraphs or subparts of the document with respect to the user model. Alternatively, it may be based on a simple statistical analysis of the occurrences of terminology from the user's interest model in the text at the time the document is being downloaded, thus with no need for pre-fetching the document text.

Re-ranking. The list of documents provided by one or more search engines may be re-ranked based on relevance ranking and based on a representation of the user's need. The re-ranking may be based on but not restricted to the analysis of information from the summaries provided by the search engines or by pre-fetching the document text and performing additional relevance assessment. This analysis may range from simple pattern matching of the document text and the terminology in the user model to deeper linguistic and statistical analyses and relevance scoring of the document texts.

Document Thumbnailing. Based on a downloaded document, a thumbnail image of the document may be created with or without highlighting of various information found in the document text (e.g., the user query term, the expanded model of the user need, most salient sentences in the text, etc.). Links from the thumbnail image to the document text could be provided to enable easy browsing through the document. By providing visual cues, the thumbnail image of a document provides assistance in assessing the relevance of the whole or parts of the document.

Summarization. A summary of the document text can be provided by, but is not restricted to, extracting salient sentences from the text as identified, for example, by pattern matching with the terminology of the user's interest model or by a deeper linguistic and statistical analysis of the document text. In one instance of the present invention, the summaries are generated based on various entities and entity relations found in the text, related to or independent from the current user's interest model.

Link analysis. The internal and external links on a web page can be assessed by, for example, downloading the text of the linked documents in the background and assessing their utility with respect to the user model. Such information may be communicated to the user as an aid in deciding whether or not to follow the links.

Figure 8:
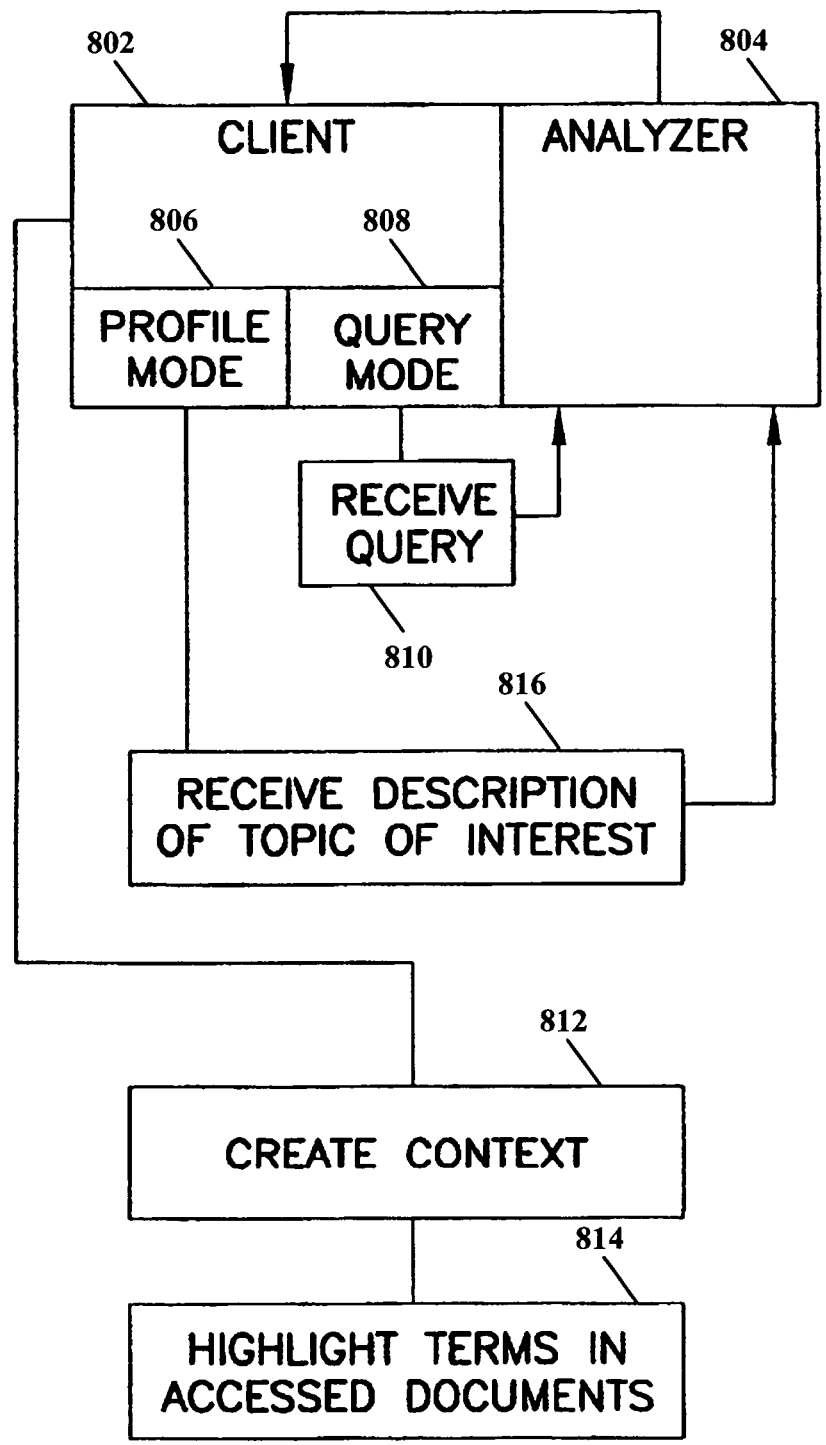
FIG. 8 is a block diagram showing the flow structure of creation of a context and its application to documents to provide highlighting.

In FIG. 8, a terminology highlighting or marking facility, which is one of the features of the information highlighting facility 606 is indicated generally at 800. The terminology highlighting facility consists of a client component 802 (i.e., highlighter) that can be an independent application or part of a browser. The highlighter operates in one of two modes: query mode 808 and profile mode 806. The highlighting facility also consists of an analyzer 804.

In the query mode, when a query is issued, the highlighter captures the query at 810 (such as from the search window on the search engines web page) as entered by the user and sends it to the analyzer 804 for syntactic analysis and semantic expansion. Note that instead of capturing the query from the search engine page the highlighting application can provide a separate window or a search box for typing in the query. That query could then be sent to any search engine. The advantage of this approach is that the user need not retype the query if the user wants to use services of different search engines or other Web services in general.

The query analyzer 804 is a (local or remote) service that takes the query term or any other short description on a topic as input, and returns an augmented set of terms to the client as a result. The query term analysis is completely independent of the actual search and can be processed in parallel while the search engine is processing the query. In one instance of the present invention, the analyzer is implemented as a remote service that accepts terms for analysis via a network connection.

The original query terms and the augmented set of terms together represent the query context as indicated at 812. The system also makes association between the result page and the query context in order to ensure the original query is used for default highlighting until the user explicitly changes the context. When the user browses the Web within this query context (by choosing one of the links that represents a document found by the search engine), the corresponding terms are highlighted in the accessed document at 814.

Note that there can be any number of active contexts stored in the terminology highlighter. The association between the result page and the original query may be used to enforce the default highlighting of all the documents on the result list. For instance, if a user returns to the result page of a previous query, the terms of that query context will be highlighted if a document is browsed to from the result page. Additionally, terms of one context can be applied to and highlighted within documents of a different query context, and new contexts can be constructed by combining terms of other contexts (for example the terms of several related queries can be combined or merged to build a new context).

In the profile mode 806, the user can provide (e.g., by means of a dialog box) a description of the topic of interest at 816 which is then analyzed at 804 analogously to the user's query to provide an augmented set of profile terms. This set of profile terms may be created in parallel with other activities that the user may perform and is then used as a basis for highlighting 814 of all subsequent documents that the user accesses either in real time, or as a background task. The model of the user's interest may also be used as a basis for highlighting 814.

Figure 9:
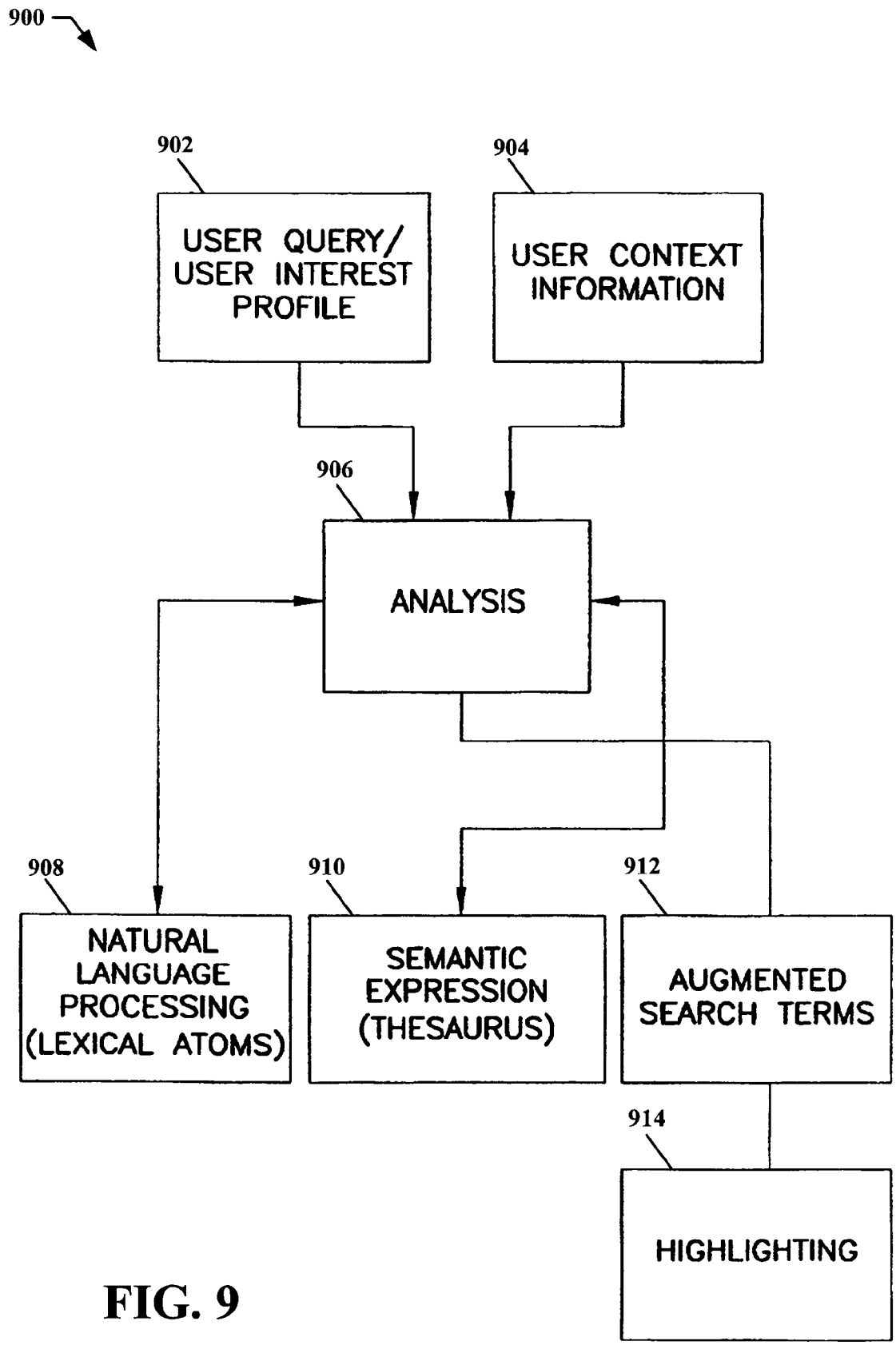
FIG. 9 is a block diagram showing components involved in providing augmented search terms and highlighting.

In FIG. 9, a block diagram shows components involved in providing augmented search terms and highlighting generally at 900. A user query (in the search mode) or the description of the user's interest (e.g., in the browsing mode) is represented at 902 and is generated by a user for sending to a search engine or providing it to the read system as an interest profile. The query may be created on a search engine page, or may also be created on the client side in a separate window or search box, and then sent to the search engine. User context information is gathered at 904, and comprises an analysis of the tasks that a user is performing, and analysis of other searches or interest profiles that appear to be related. An analysis engine 906 receives the query and context information, and (in one instance of the present invention) uses natural language processing at 908 and semantic expansion at 910 to provide a model of the user's interest, which in one instance of the present invention may be a set of augmented search terms 912 or a user interest profile. Highlighting of text is then performed at 914 based on the model 912, in one instance of the present invention by selecting a bright background color for all terms found in the document. When used to mark or highlight portions of the document, the model provides the ability to better identify text which is more relevant to the actual intent of the user. Several different types of additional highlighting are described with reference to further figures below. In one instance of the present invention, the document text is accessed and analyzed statistically and linguistically. This analysis enables more sophisticated highlighting methods. For example, highlighting of terms that play a role of a subject or object in the query or profile description is more effective for reading a document than highlighting in the document all the concepts that appear in the query or the profile description. Similarly, query and interest profile terms could be highlighted in the document text only if they appear to have a specific linguistic role, e.g., the role of a subject or object.

A highlighting facility on a computer provides information to a user to independently assist the user in evaluating the relevance of documents identified by a search engine or some other information providing service in response to a user query or the relevance of documents accessed in a browsing mode in relation to a particular user's interest. When accessing documents identified as relevant by the information providing service or in the browsing mode from other networked computers, the facility determines why a document may be of interest, and provides information or highlighting to assist the user in determining whether the document is desired.

An important characteristic of the Web is a separation of data gathering and indexing from information delivery and presentation. The information highlighting facility deals with the presentation and information highlighting of documents to facilitate reading, comprehension, and assimilation of information found in the accessed documents. Information highlighting is independent of the search, and thus searches from multiple different search engines can be relevance assessed and ranked together in a consistent manner. By providing the highlighting based on actual retrieved documents, up to date versions of the documents are assured. The facility may base relevancy of a retrieved document on the original query, or a model of the user's interest, which may include an augmented set of search terms or enhanced version of the query which takes into account the general interest of the user as captured by an interest profile and context of use of the computer by the user, or a combination thereof. This provides a consistent and enhanced ability to correctly identify relevance of each document, rather than rely on the search engine basing relevance purely on a single query.

Linguistic analysis and semantic expansion to provide the augmented version or set of terms is done in parallel with the execution of the query by one or more search engines to provide relevance more quickly. The model of the user's interest is then applied by the facility to documents as they are accessed through a browser to provide highlighting of relevant portions of the document. The model can be thought of as an interest profile context, or representation of the user's information need. When browsing the web within this context or session, the corresponding terms are highlighted in the accessed documents.

The facility may also be run as a remote service on a powerful computer (in contrast to the possibly less powerful local computers use by the user to further speed up processing and minimize delays. The remote service computer may in fact have a much higher bandwidth connection to the network, and be able to process many documents while the user is still considering the list of documents returned by the search engine or some other information providing service.

Documents may be scrolled to the most relevant portion of a multi-page document based on pattern matching of the document text with the query or interest profile terms or by relevance scoring of individual paragraphs or subparts of the document based on the model. The list of documents provided by one or more search engines may also be re-ranked based on relevance ranking and based on a representation of the user's need. The re-ranking may be based on summaries provided by the search engines, or by actually retrieving the documents and either pattern matching with the augmented terms or performing a deeper linguistic and statistical analysis of the document text, or based on the model and assessing the document relevance to the query.

Information, such as names of entities (e.g., the person's or a company name) and the relations among the entities may be extracted using well known heuristics and lexicon lookups, and provided as a list, linked back into the document. For such names and relations, external links can also be found by local lookup or query and provided to the user. Further, based on the downloaded documents, thumbnails of the documents may be created with highlighting corresponding to the most relevant portions of the documents. Links to the document are provided within the thumbnail based on the highlighting or discrete portions within the thumbnail corresponding to the relevant portions of the document. The thumbnail provides a visual representation of the relevance of the entire document and allows the user to quickly identify an area of the document to help determine its relevance.

A summary of the document text can be provided by extracting salient sentences from the text as identified by pattern matching with the augmented terms or a deeper linguistic and statistical analysis of the document text, or based on the model. Summaries can also be generated based on important entities and entity relations found in the text, related to or independent from the current user's interest or query context. In a browsing mode, the internal and external links on a web page currently viewed can be assessed by downloading the text of linked documents in the background and assessing their relevance to the user's need and interest. Such information may be communicated to the user as an aid in deciding whether or not to follow the links.

These different ways of providing relevance information can be divided into categories based on whether they require analysis of the target documents or not. Some can be effectively implemented based on a very shallow analysis of the document text, practically by pattern matching without having to access the document in advance. These include highlighting, scrolling and thumbnail creation and highlighting. Some ways are better implemented by downloading the document text and providing a deeper linguistic analysis of the text. These include more sophisticated document highlighting, scrolling and thumbnail highlighting, entity extraction and entity relation finding, summarization of documents, re-ranking of the retrieved documents and assessment of hyperlinks in the documents.

The model of the user's interest may also vary across a broad spectrum from simple to more detailed. The original user's description of the query may be used in one instance of the present invention. Further variations include using the augmented query, an original description of the interest profile, an enhanced description of the interest profile, general interest profiles which are not user specific, but are selected from some topical hierarchy—a library of topic profiles, and query/interest profile combined with information about the user's task.

In the present invention, document presentation and document analysis features within a distributed computer network environment are provided where document gathering, indexing and relevance assessment with respect to a user's query is independent from document delivery and presentation to the user. The user's need is separated from the search strategy. In other words, the user's query and interest profile are modeled independently from search activities such as by applying linguistic analysis. Further, support for relevance assessment is provided in both the search and browsing modes. The user interest model is applied to view and analyze documents that are accessed as a result of the search activity or by browsing Web documents.

In view of the exemplary systems shown and described above, methodologies that may be implemented in accordance with the present invention will be better appreciated with reference to the flow charts of FIGS. 10-17. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

Figure 10:
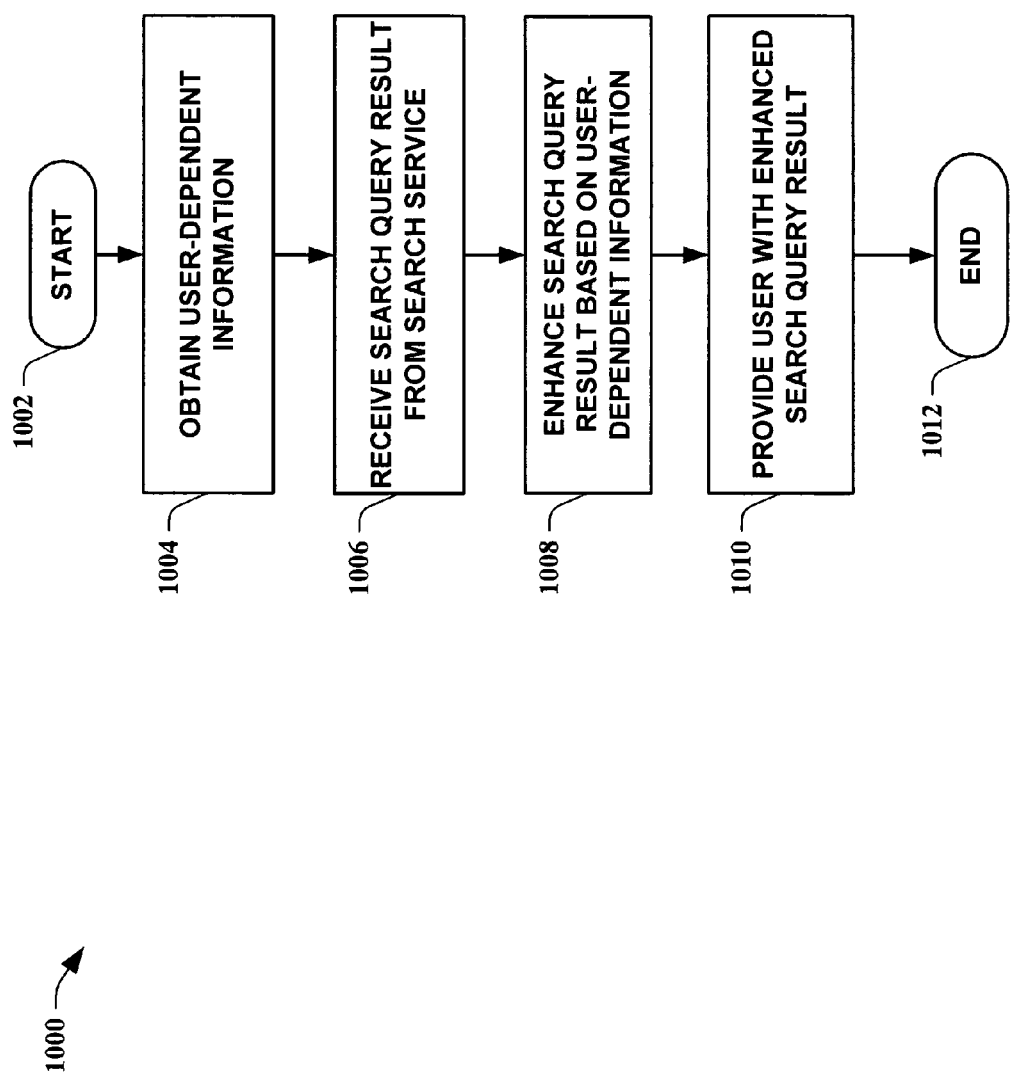
FIG. 10 is a flow diagram of a method of facilitating search query results in accordance with an aspect of the present invention.

In FIG. 10, a flow diagram of a method 1000 of facilitating search query results in accordance with an aspect of the present invention is illustrated. The method 1000 starts 1002 by obtaining user-dependent information 1004. This can include user profile information, context information, user search query rules, and additional user-related information and the like. A search query result is then received from a search service 1006. The search service can be remote and/or in close proximity. The search query result is then enhanced based on the user-dependent information 1008. Enhancing can include, but is not limited to, providing search term density and/or link content information and the like. The enhanced search query result information is then relayed to a user via a user interface 1010, ending the flow 1012. The dissemination of the information to the user can be, but is not limited to, thumbnail views, highlighting, color coding, and symbol coding and the like.

Figure 11:
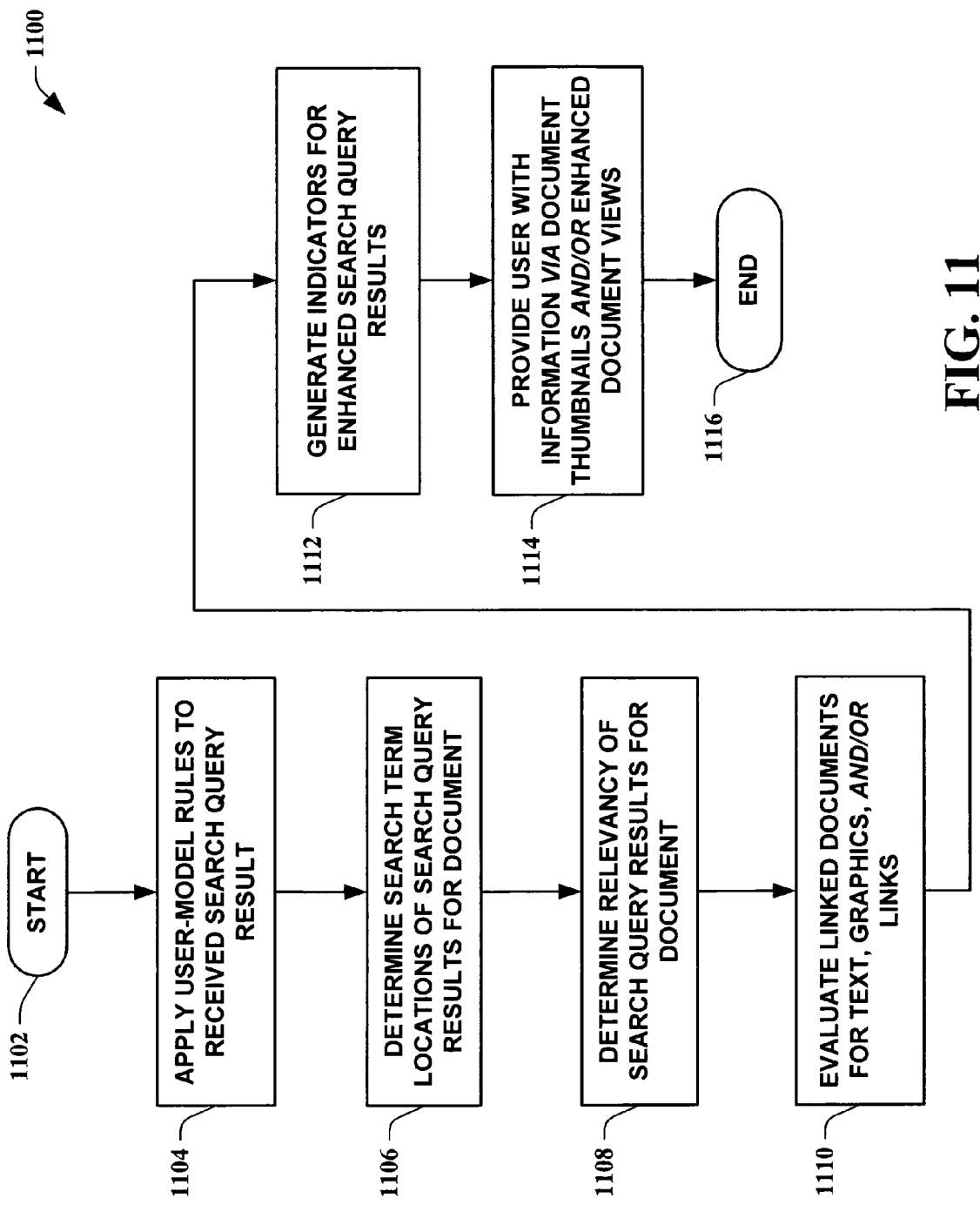
FIG. 11 is a flow diagram of a method of enhancing a search query result in accordance with an aspect of the present invention.

Referring to FIG. 11, a flow diagram of a method 1100 of enhancing a search query result in accordance with an aspect of the present invention is shown. The method 1100 starts 1102 by applying user-model rules to a received search query result 1104. The user-model rules can include, but are not limited to, search quantity rules, search quality rules, search coding rules, search display rules, and search thumbnail option rules (e.g., size, shape, color, and placement, etc.). The rules can be directly input by a user and/or derived via user-dependent data such as, for example, context, user profile, and other user-related data. Search term locations are then determined for a document such as a web page and the like related to a search query result 1106. Relevancy of the search query results is then determined for the document 1108. Relevancy can include, but is not limited to, how many of the search terms are found in a particular location within the document and the like. The linked documents (e.g., URLs to other web pages) are then evaluated to determine their content for text content, graphics content, and/or link content and the like 1110. The evaluation can additionally include determining a measure of content such as, for example, a percentage and/or a volumetric indicator (e.g., symbol indicating half-full, etc.) and the like. Indicators are then generated for the enhanced search query results 1112. These indicators can be, but are not limited to, color indicators, color intensity indicators, symbols, geometric shapes, quantity of geometric shapes, and numeric indicators and the like. The user-dependent search query information (enhanced information) is then provided to a user via document thumbnails and/or enhanced document views 1114, ending the flow 1116. For example, in one instance of the present invention, a thumbnail view is superimposed over a portion of a web page that a user selected in order to review a search query result link. This allows a user to see the entire web page as opposed to being limited by the size of a monitor, etc.

Figure 12:
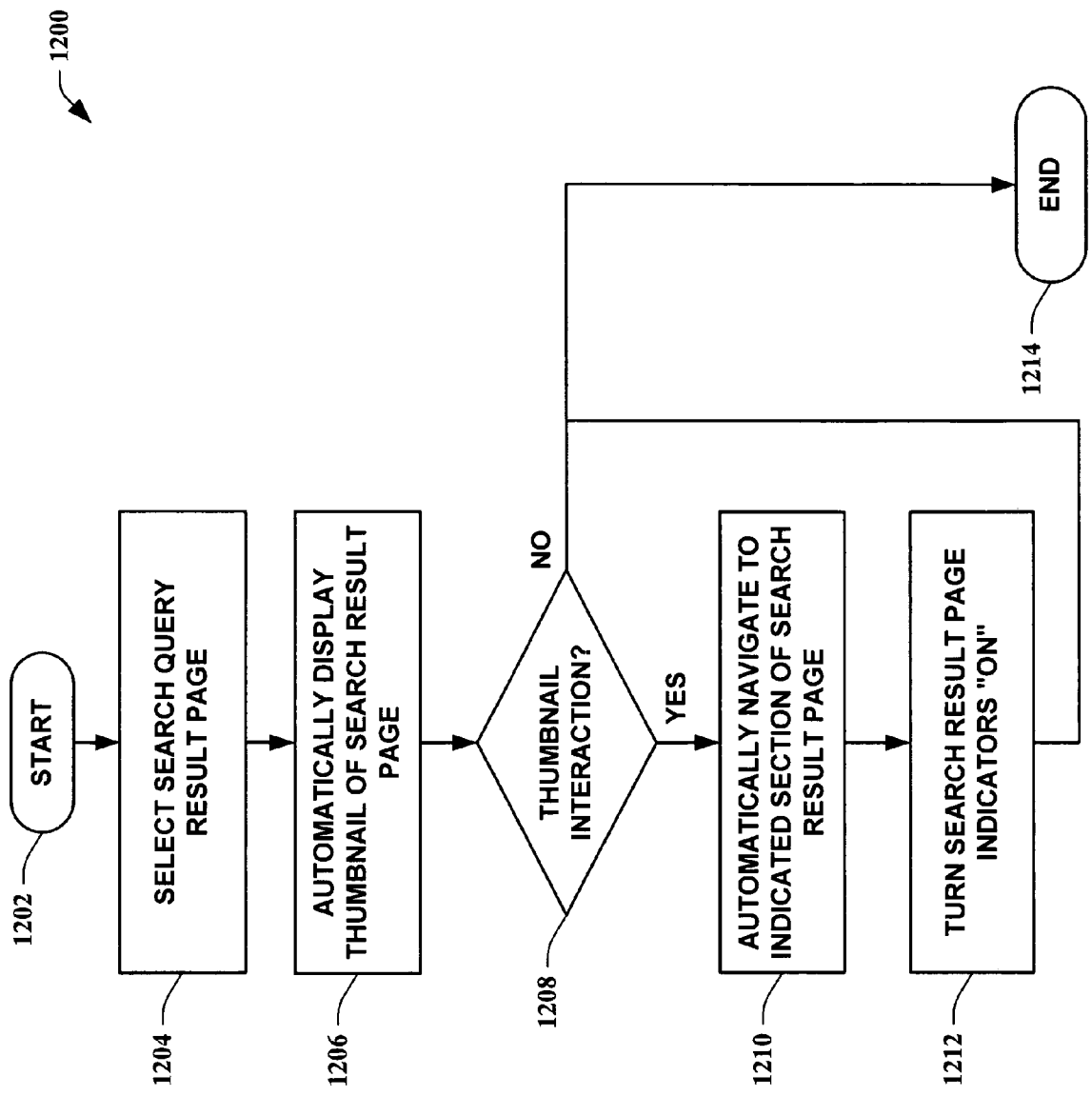
FIG. 12 is a flow diagram of a method of relaying enhanced search query result information in accordance with an aspect of the present invention.

Looking at FIG. 12, a flow diagram of a method 1200 of relaying enhanced search query result information in accordance with an aspect of the present invention is depicted. The method 1200 starts 1202 by selecting a search query result page (i.e., selecting a link via clicking, hovering, key strokes, etc.) 1204. A thumbnail of the search query result page is then automatically displayed 1206. A determination is then made as to whether a user has interacted with the thumbnail (e.g., clicked on it, selected it, and/or highlighted it, etc.) 1208. If no interaction by the user has occurred, the flow ends 1214. If an interaction has occurred, navigation is automatically engaged to a location within the search query result page that corresponds to an area impacted by the interaction 1210. Indicators provided by enhancing processes of the present invention are then turned ON for the search query result page 1212, indicating appropriate data, ending the flow 1214. In this manner, a user can quickly assess whether a web page contains information that the user is looking for. The thumbnail gives the user a full view of the page and also allows a quick means to jump to a particular portion of the web page via the thumbnail. For instance, a user could click on the portion of the thumbnail that indicates a high density of search terms and quickly read that section to determine its relevancy.

Figure 13:
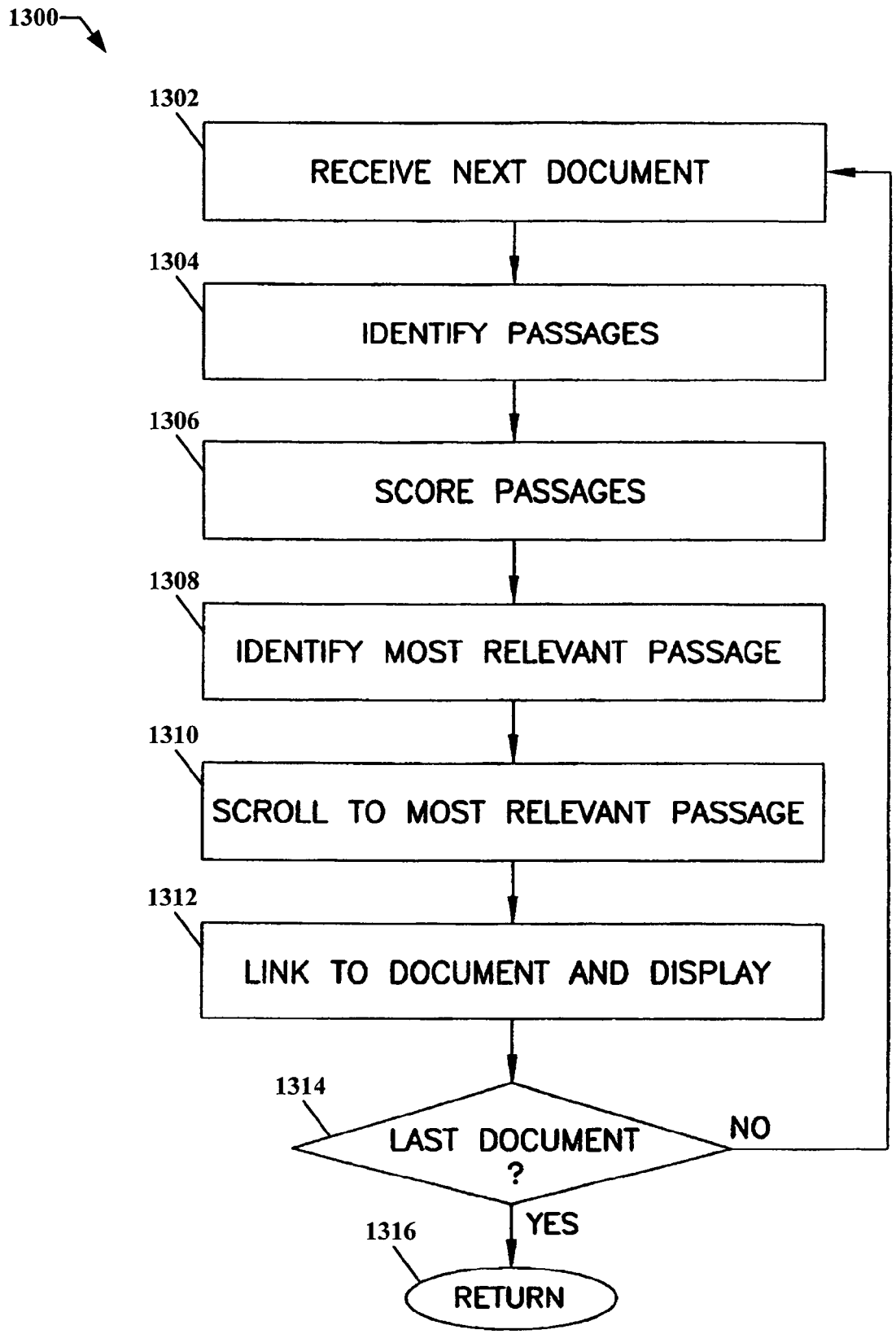
FIG. 13 is a flow diagram showing scrolling of a document to its most relevant portion.

The present invention employs further methods that enable detailed information to be extracted and/or utilized as follows. In FIG. 13, a flow diagram indicated generally at 1300 shows scrolling of a document to its most relevant portion based on the analysis of the document text. A next document identified in search results or accessed by browsing is received at 1302. Subparts of the document are identified at 1304. The subparts may be passages, sentences, lines, or paragraphs, all of a desired length or the length determined based on the distribution of query terms in the text. The subparts may in fact overlap if desired. Each of the subparts is then scored at 1306 in one of several well known relevance matching functions with respect to the model of the user's interest. Statistics from any reference corpus can be used for that purpose. The scoring may also be similar to that used by the search engine, but may also include the use of the model to give a better indication of relevancy. Further, a best portion of the document may be identified by combining consecutive paragraph scores or applying another method, such as (in one instance of the present invention) a Hidden Markov Model (well known in the art) to identify the best passage at 1308. At 1310, the document is scrolled to the most relevant passage as identified above. The most relevant passage may be scrolled to in the actual document, or may be part of a list of passages which are provided with a link at 1312 to corresponding documents. This provides a document list showing the most relevant passage of each document to enable the user to determine which document may be most relevant. If the latter, decision block 1314 determines whether the document received was the last document in the search results, or selected portion of search results for this function. If not, the next document is received at 1302, and its most relevant portion identified. If it was the last document, control is returned at 1316.

In one instance of the present invention, the scrolling of the document is based purely on the pattern matching of the document text with the query or model of the user's interest. For example, the document is automatically scrolled to the first occurrence in the text of an important concept in the query or model. Further, the document can be scrolled to the paragraph with the highest density of the query or correlation with the model of the user's interest. These document scrolling methods do not require accessing and analyzing document text in advance.

Figure 14:
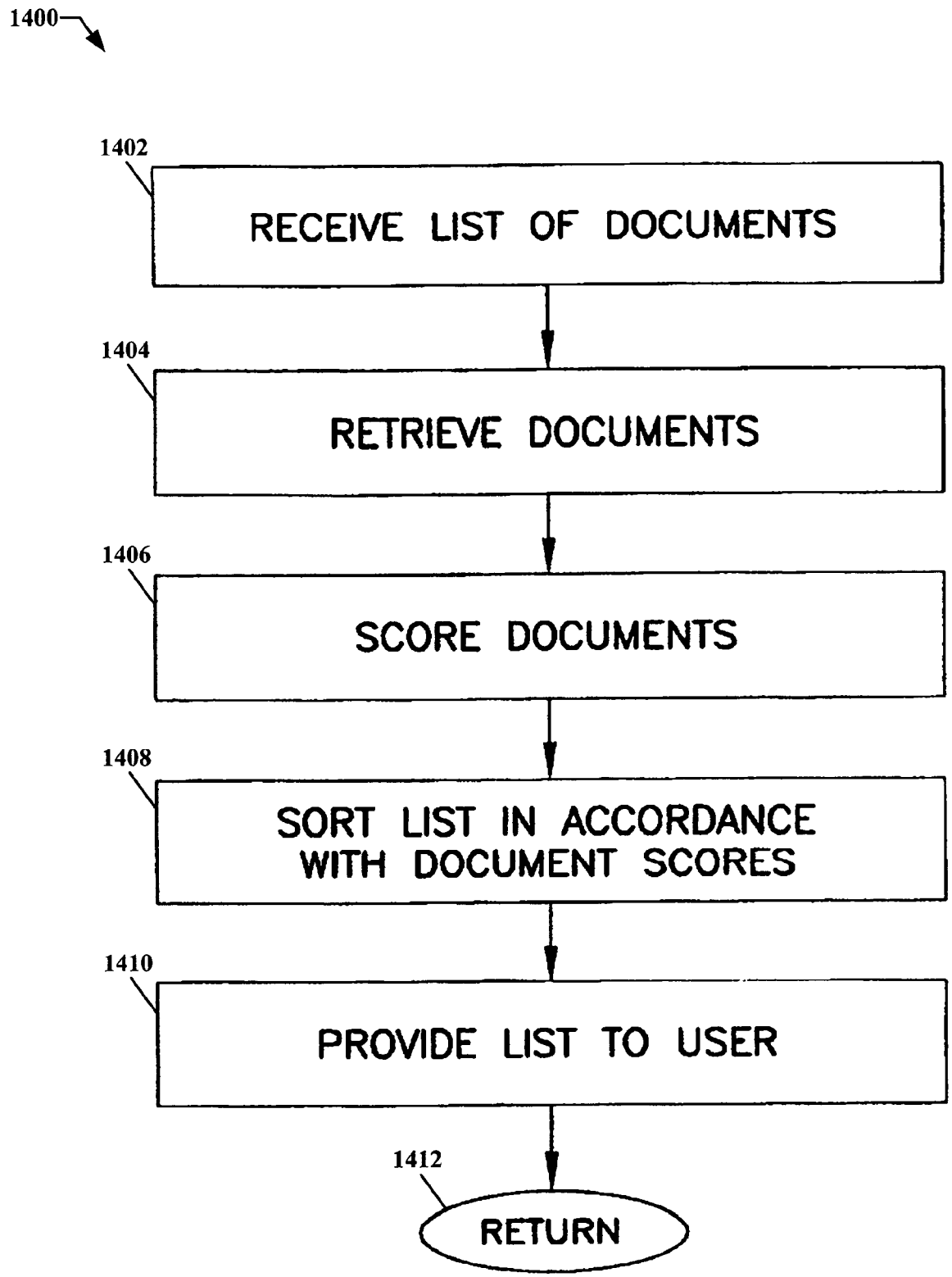
FIG. 14 is a flow diagram showing re-ranking of documents provided by a search engine.

In FIG. 14, a flow diagram indicated generally at 1400 shows re-ranking of a list of documents provided by a search engine or the documents that are linked to the currently viewed document via hyperlinks. In the search mode, the list of documents is received at 1402, and the top N documents referred to as best hits by the search engine are accessed from the respective servers at 1404, as a background task while the user may be looking at the list, or performing other tasks. N may range from 2 to as many as resource constraints permit. N is 30 in one instance of the present invention. The entire document, or some number (K) of pages of the document may be used. Each document may then be scored at 1406 in its entirety or similarly to the portion scoring as described previously using a relevance matching method. The scoring may be based on the model, including at least augmented search terms and linguistic analysis of the document text. The list of documents is then sorted in accordance with the document scores at 1408. An alternative rank of each of the documents can be provided, or a new list of less than N provided. The list is then provided to the user at 1410, and control is returned at 1412.

In the browsing mode, the list of documents received at 1402 represents all the documents linked to the currently viewed document. The documents are accessed from the respective servers at 1404 in the background and scored at 1406 for relevance with respect to the model of the user's interest that the current document may be associated with. The resulting score for each linked document is then displayed in relation to the document link on the current page and serves as a guide for following the links if desired.

Figure 15:
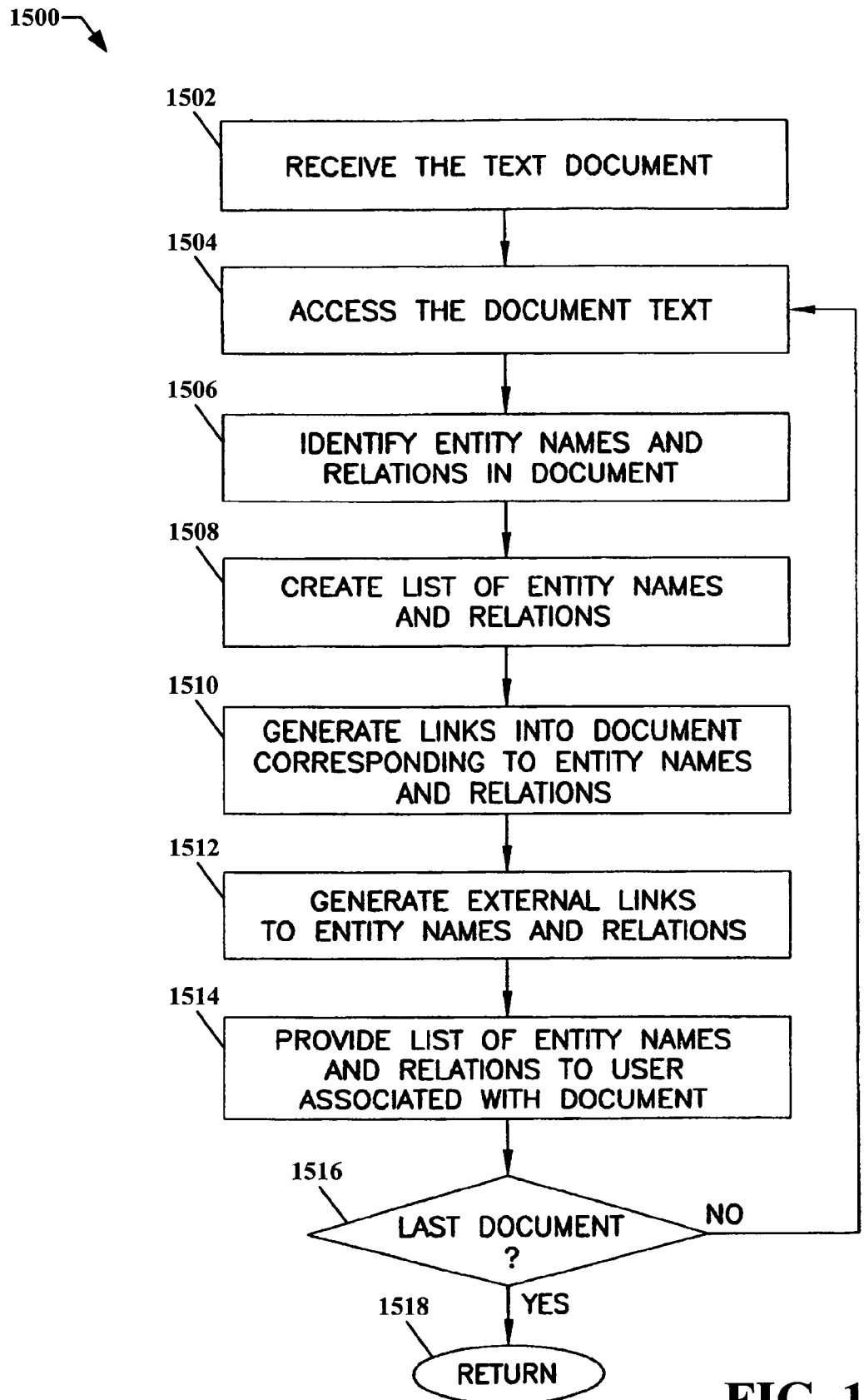
FIG. 15 is a flow diagram showing the identification and provision of a list of names associated with a document.

In FIG. 15, a flow diagram indicated generally at 1500 shows identification and provision of a list of entities (such as names associated with a document) and relations among entities in a document. A document is received at 1502, and documents are downloaded at 1504. Heuristics for identifying entity names and relations among entities (e.g., for person names that may include recognizing titles, capitalization, position and function in the sentence, etc.) combined with lexicon lookups, are then applied to identify entity names and relations in the document at 1506. A list of entity names and relations is created at 1508. At 1510, links into the document corresponding to the entity names and relations are provided. In one instance of the present invention, the list of extracted entities is displayed in a separate window, and each entity is supplied with navigational features, such as an up and down arrow to navigate to next and previous occurrences of the entity in the document. Information about the particular entity or entity relation may be extracted from additional resources at 1512. For example, if the entity is a company name, appropriate information services providing information about such entities can be used to supply a link to the web site of the particular company. If the entity is a person name, the user may be able to access a person's web site using appropriate information services, or if the person is a publicly known figure, the latest information available from the press. Similarly, if two entities, for example a person with the name N and a company with the name C are connected through the relationship "N is the President of C" the system can provide the link to the pages where the person N is mentioned as the President of C. This feature may apply to a variety of entities, such as geographical features, countries, trademarks, etc. and typical or important relations among such entities. The list of entity names and relations with links is provided to the user at 1514, and if the last document has been processed at 1516, control is returned at 1518. This process may be applied to a selected number of documents, or may continue in the background as long as is desired, or until the context is switched.

Figure 16:
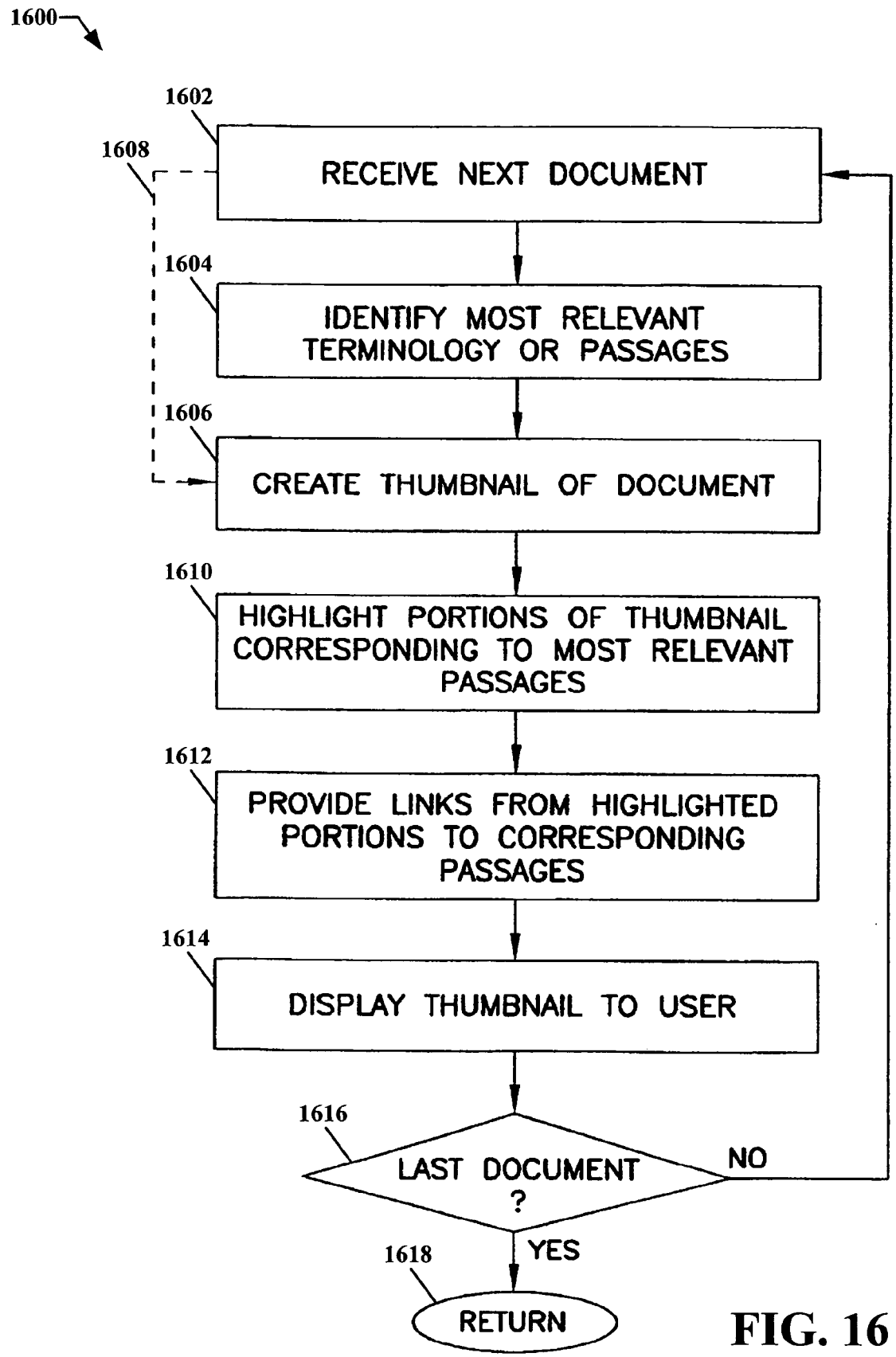
FIG. 16 is a flow diagram showing the creation of a thumbnail of a document with highlighting.

In FIG. 16, a flow diagram indicated generally at 1600 shows creation of a thumbnail of a document with highlighting. A next document is received through browsing or downloaded at 1602 from the list of documents provided by a search engine. If the accessed document can be viewed as a single screen document (of some default size, for example) a thumbnail of the whole document is created. On the Web, the concept of a page is different from traditional paper documents. The size of a page can be a fixed size specified by the user or the system, or can be based on the size of the window used to view the document. For multi-page documents the most relevant passages can be found at 1604, and a thumbnail of the page contain the best passage created at 1606.

The thumbnail appears as a single sheet of paper and may either relate to the first page of a document, or some scaled version or abstract representation of the document. Larger documents may even be displayed as a stack of thumbnails with navigation there between. As an alternative, the thumbnail of multi-page documents can be created at 1606 without identifying the most relevant passages as represented by broken line 1608. Instead, the thumbnail may be an abstract representation of the whole document in the form of a fixed length page partitioned into blocks that corresponds to pages. They can be colored to reflect the presence of important terminology in the particular part of the document. For example, the color of the particular block can be related to the color used to highlight the most prominent term in that part of the document. The result of this approach is a thumbnail filled with the spectrum of colored blocks that visualize the relevance of each part of the document.

At 1610, portions of the thumbnail corresponding to the most relevant passages are highlighted. Portions may also be highlighted without assessing the relevance of the passages. Links are then provided at 1612 from the highlighted portions to the corresponding passages or portions of the document. The thumbnail is then displayed to the user at 1614, and the process is repeated based on decision block 1616 for a selected number of documents. Control is returned at 1618.

In one instance of the present invention, the thumbnail highlighting is based on the pattern matching of the query terms or interest profile terms without deeper linguistic analysis of the document text and identification of relevant passages. Generally, thumbnail highlighting can be done with respect to any information about the user's interest or information extracted from the document.

Figure 17:
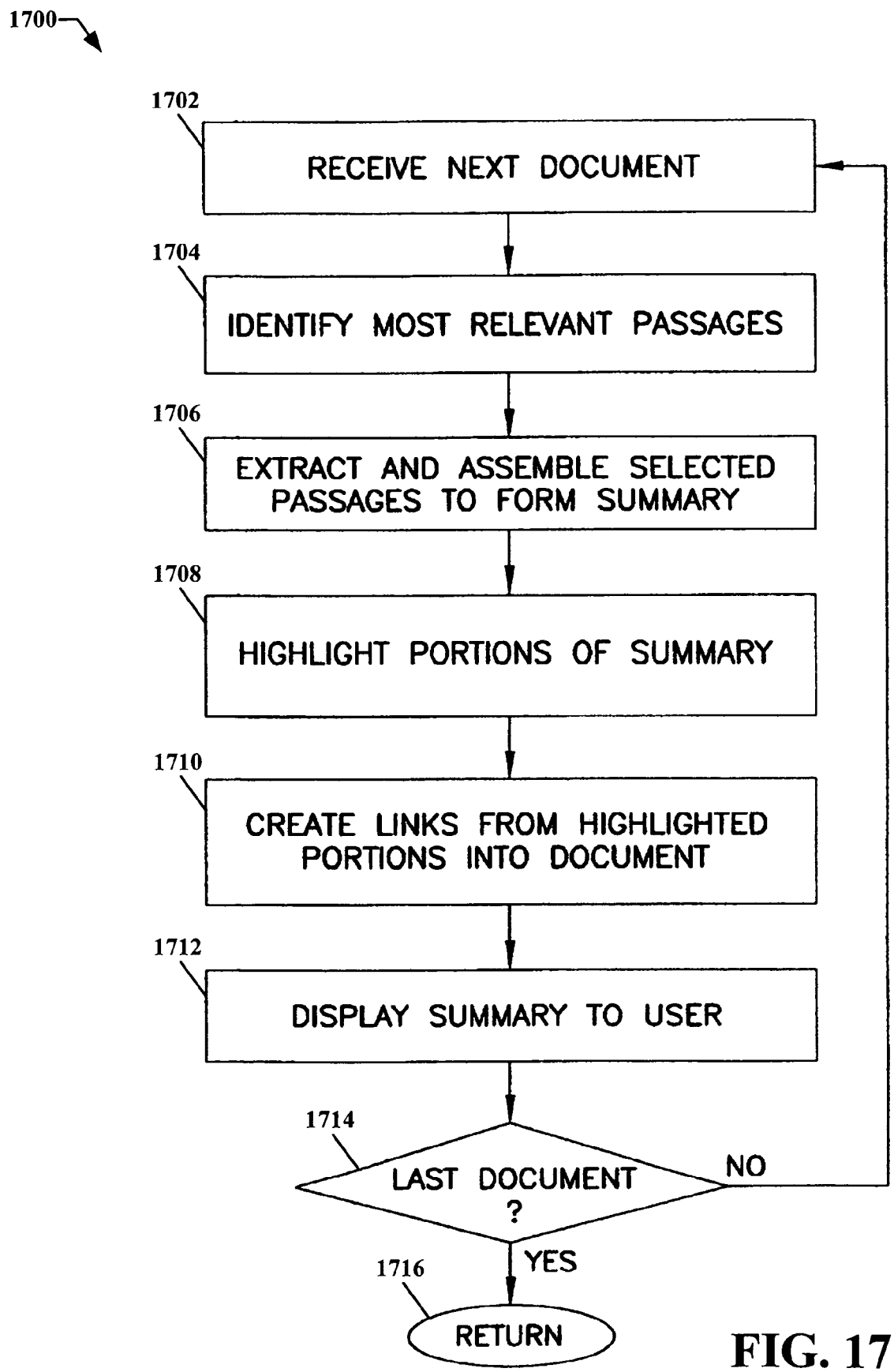
FIG. 17 is a flow diagram showing the creation of a summary of a document.

In FIG. 17, a flow diagram indicated generally at 1700 shows creation of a summary of a document. A next document is received at 1702, and the most relevant passages with respect to the model which may include the query (in the search mode) or interest profile (in the browsing mode) or independent from the current user's context are identified at 1704 as previously described. Selected passages are then extracted and assembled to form a summary at 1706. In this instance of the present invention, the summaries are created by extracting sentences from the text that contain prominent query terminology. The summary may also be limited to a predetermined length, with the most relevant passages or sentences being used first.

Portions of the summary are highlighted at 1708, and links are created there from to corresponding portions of the document at 1710. The summary is then displayed to the user at 1712, and further documents are processed in the same manner based on decision block 1714. Control is returned at 1716.

The aforementioned flows are meant to be representative flows of various methods of the present invention. They in no way encompass every iteration and variance within the scope of the present invention. Those skilled in the art can appreciate that a method can incorporate modifications and still remain within the purview of the present invention.

Additionally, the present invention allows for user interaction with user-dependent search query result information. One method of allowing user interactivity is to provide a graphical style user interface. A user can then initiate, change, review, and/or augment the enhanced search query result information provided by the present invention easily. One skilled in the art can appreciate that a multitude of varying graphical interfaces are possible. As an example of just one possible interface of the present invention, an illustration of a graphical user interface set or "process" is described. Generally, a user interface is comprised of at least one graphic, often a set of graphics, that is generated by a computing device and shown on a display for visual reference and interaction by the user. This set of graphics is typically referred to as a "graphical user interface" (GUI) even though it is comprised of more than one graphic. Thus, components such as sub-graphics, drop down menus and tables, selection devices, and text entry boxes and the like are all considered part of the graphical user interface.

Likewise, the present invention also includes non-graphical user interfaces such as text based user interfaces and/or mixed graphics/text based interfaces. Although generally not as easy to interface with as a graphical interface, a text based interface can still be employed by the present invention to allow user interaction and to also allow a single user action, such as a key stroke, to initiate enhanced features of the present invention.

Figure 18:
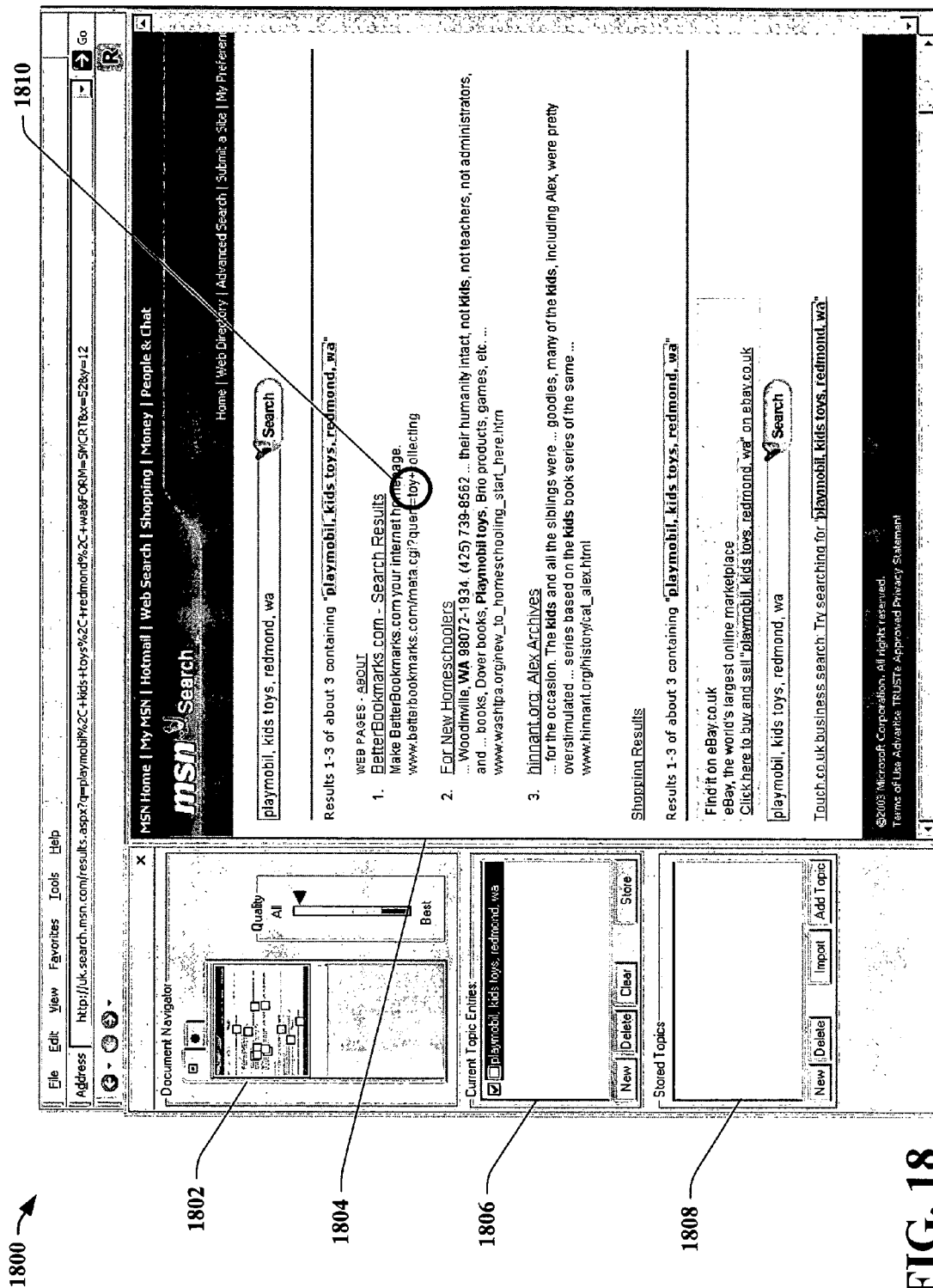
FIG. 18 is a screen shot of an enhanced search query results user interface in accordance with an aspect of the present invention.

In FIG. 18, a screen shot of an enhanced search query result user interface 1800 in accordance with an aspect of the present invention is shown. The user interface 1800 illustrates one instance of the present invention. The user interface 1800 is comprised of a page overview with a quality control 1802, a search query results page 1804, a search term view 1806, and a previous search term view 1808. The page overview 1802 indicates locations of the search terms within a relevant document (i.e., page), giving a thumbnail presentation of the whole page. Query hits are indicated, in one instance of the present invention, by small squares with varying color intensity to reflect quality level. The quality control allows a user to adjust the quality level of the document navigator highlighting indicators. The search query results page 1804 displays search results given the search terms. This is typically a listing of URLs with excerpts from each page. The search term view 1806 indicates that a search query was automatically captured and processed utilizing linguistic analysis. The full query and constituent phrases, sub-phrases, single terms and related terms (from, for example, a thesaurus) are highlighted in the thumbnail and the page view. Additional search query indicators 1810 provide quality of search query results through, for example, highlighting intensity. Intensity of the highlight depends on the 'accuracy' of a search term match. A match on a full query is highlighted with the highest saturation level, followed by phrases and sub-phrases of the search terms. Single terms that are not nouns are given the lowest level of color saturation.

Figure 19:
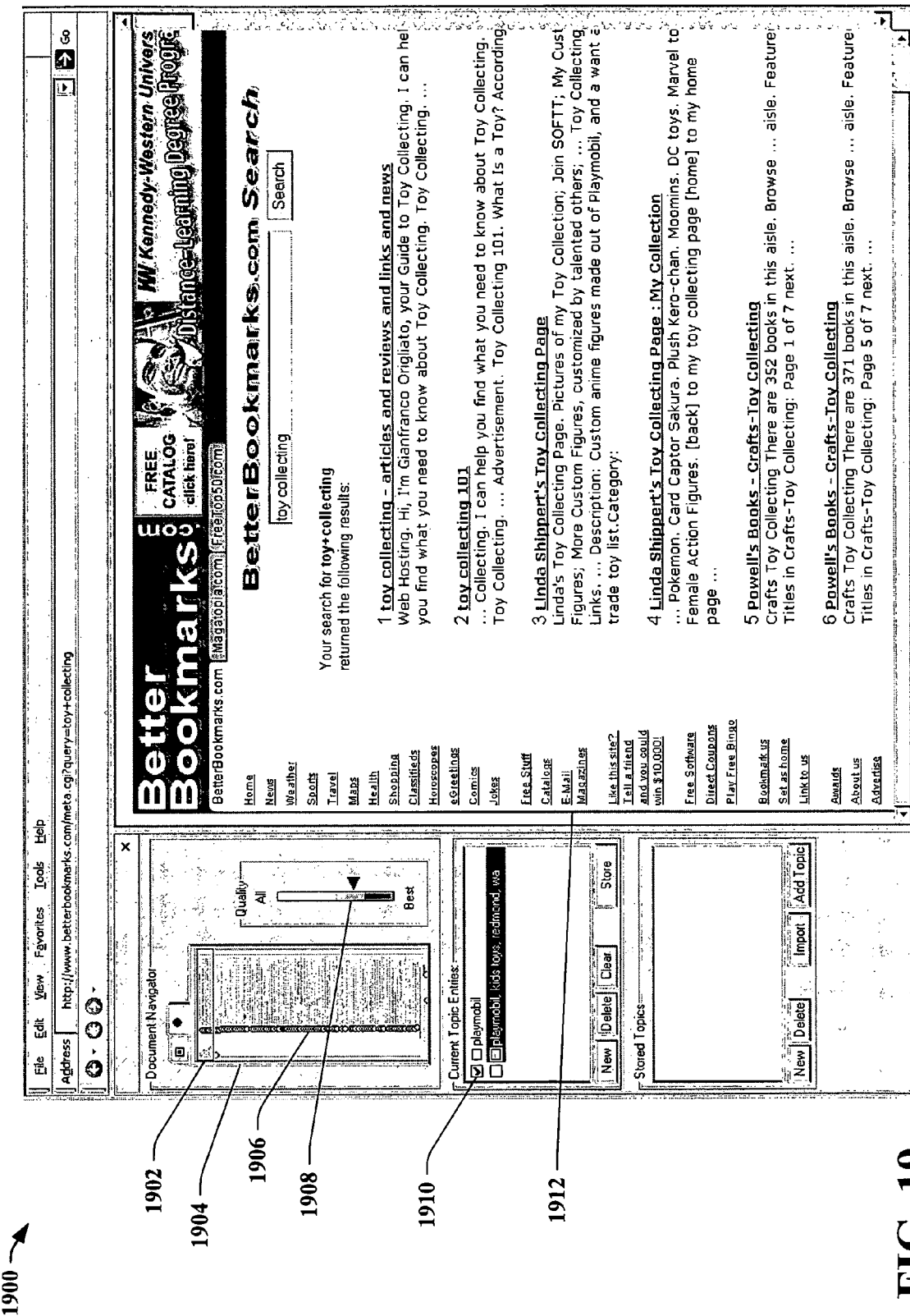
FIG. 19 is a screen shot illustrating search query results quality level for an enhanced search query results user interface in accordance with an aspect of the present invention.

Referring to FIG. 19, a screen shot illustrating search query result quality level for an enhanced search query result user interface 1900 in accordance with an aspect of the present invention is illustrated. In this illustration of the user interface 1900, a selection window 1902 is utilized to select a portion of a search results page 1912 via a thumbnail view 1904. Relevancy indicators 1906 allow the user to visually distinguish those search result links that have a higher quality than the rest. A quality level control 1908 is set, in this example, such that only higher level quality is accepted by the user. This controls the level of matches shown in the thumbnail and page highlights. In one instance of the present invention, a "best match" is a strict string match on a query. The next levels can be phrases and sub-phrases, followed by single term words. This user interface 1900 also depicts a search term subset selection 1910. This allows a user to adjust the search terms to expand and/or contract a search.

Figure 20:
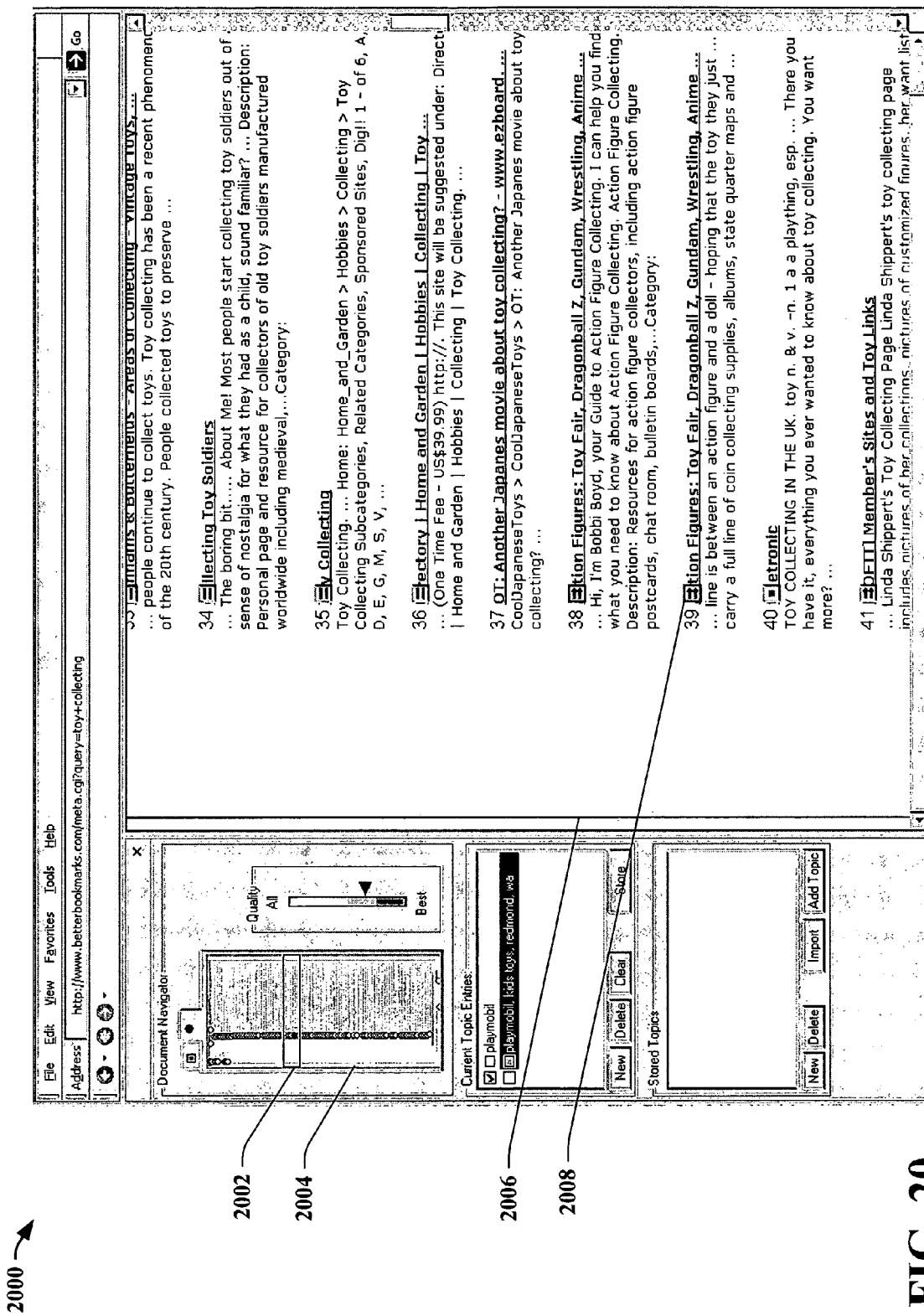
FIG. 20 is a screen shot illustrating a user selection based on search query result quality level for an enhanced search query results user interface in accordance with an aspect of the present invention.

Looking at FIG. 20, a screen shot illustrating a user selection based on search query result quality level for an enhanced search query result user interface 2000 in accordance with an aspect of the present invention is depicted. The user interface 2000 illustrates a selection window 2002 moved to a desired location by a user in a thumbnail view 2004 of a search query results page 2006. When the user selects this portion of the thumbnail view 2004, the search query results page 2006 is automatically scrolled to that location. In this example, the user has selected a portion of the search query results page 2006 that additionally includes link evaluation indicators 2008. The link evaluation indicators 2008, in this instance of the present invention, indicate if a search query result is a link to text-content (e.g., denoted by two parallel lines) and/or link-content (e.g., denoted by two parallel arrows) pages. Other indicator types can be utilized as well to convey additional information.

Figure 21:
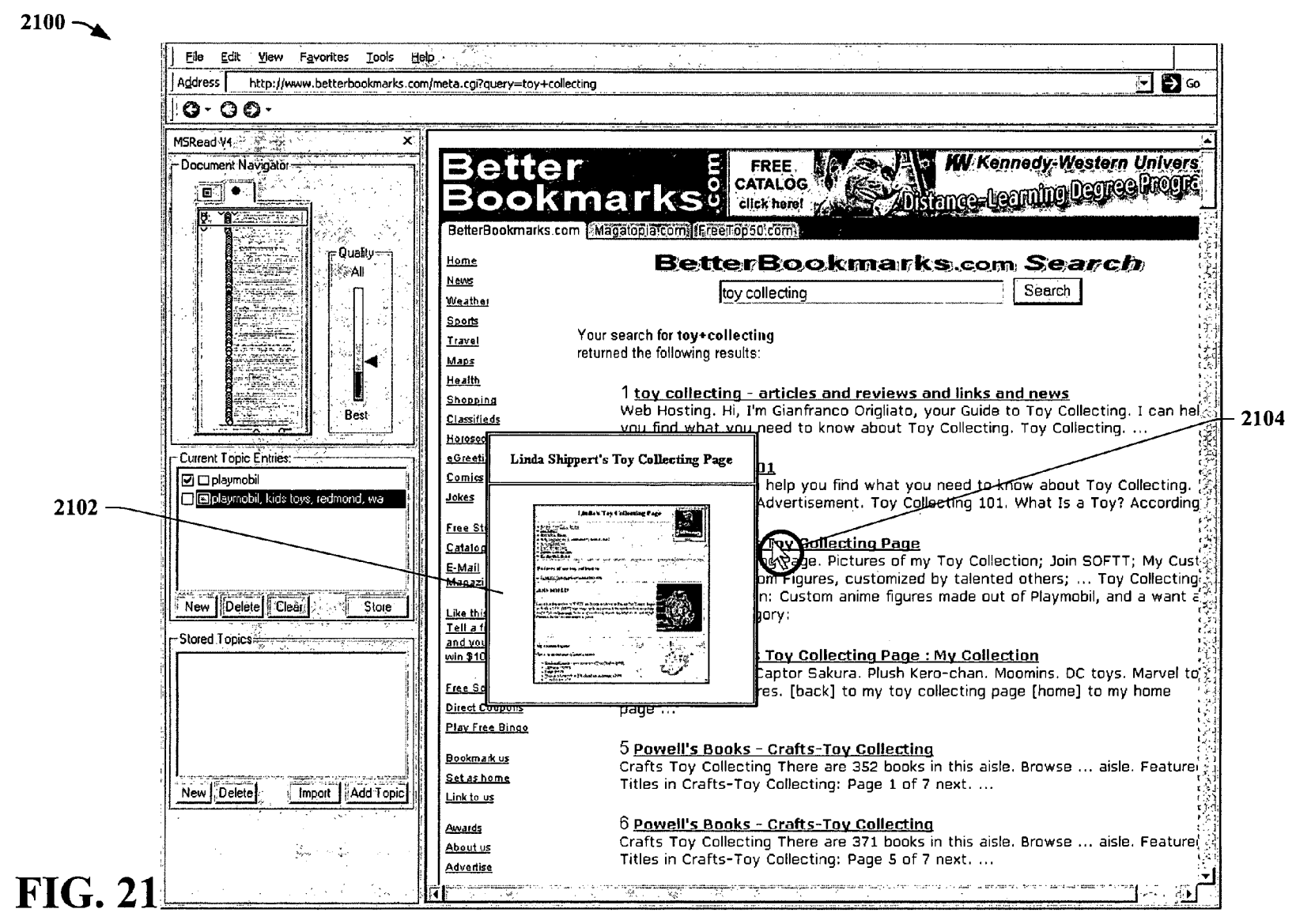
Figure 22:
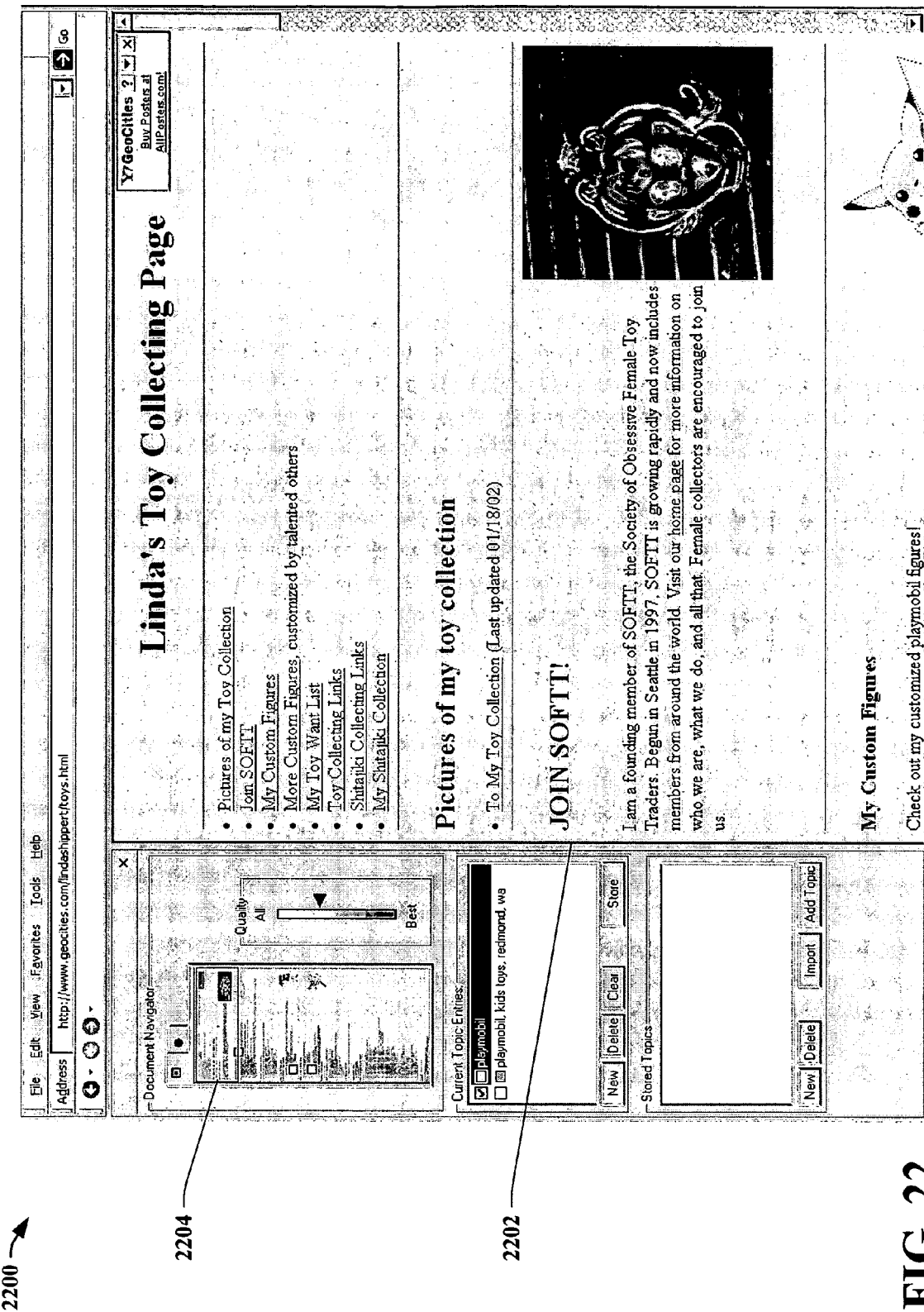
FIG. 22 is a screen shot illustrating a thumbnail view of a search result page for an enhanced search query results user interface in accordance with an aspect of the present invention.
Figure 23:
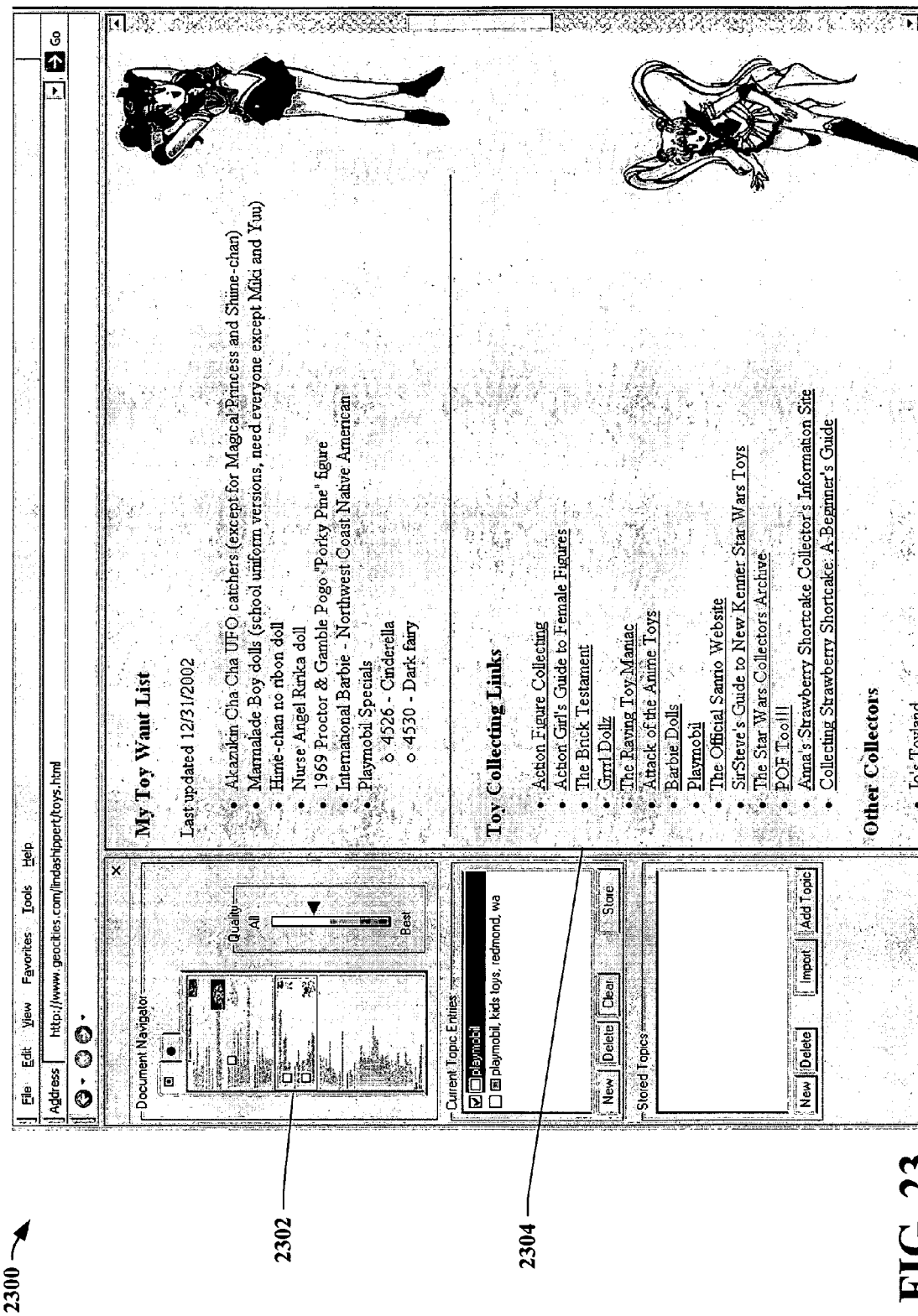
FIG. 23 is a screen shot illustrating automatic search result page scrolling after a thumbnail view selection for an enhanced search query results user interface in accordance with an aspect of the present invention.

In FIG. 21, a screen shot illustrating a thumbnail view of a selected search query result link for an enhanced search query result user interface 2100 in accordance with an aspect of the present invention is illustrated. This user interface 2100 depicts a thumbnail view 2102 of a search query result that was automatically initiated by a pointer 2104 hovering over a link to that search query result. In this manner, this instance of the present invention, easily allows the user to see the entire linked page without having to click on the link and wait for the page to load. This permits quick assessment by the user and allows non-relevant links to be quickly dismissed. FIG. 22 illustrates a resulting user interface 2200 after the user has selected a search query result link. The user interface 2200 shows a page 2202 corresponding to the selected link and positioned according to a thumbnail selection window 2204. FIG. 23 illustrates a resulting user interface 2300 when the user utilizes a thumbnail view selection window 2302 to automatically scroll to that location within a page 2304. In this manner, the user can quickly jump to a page location to assess its value and relevancy.

Figure 24:
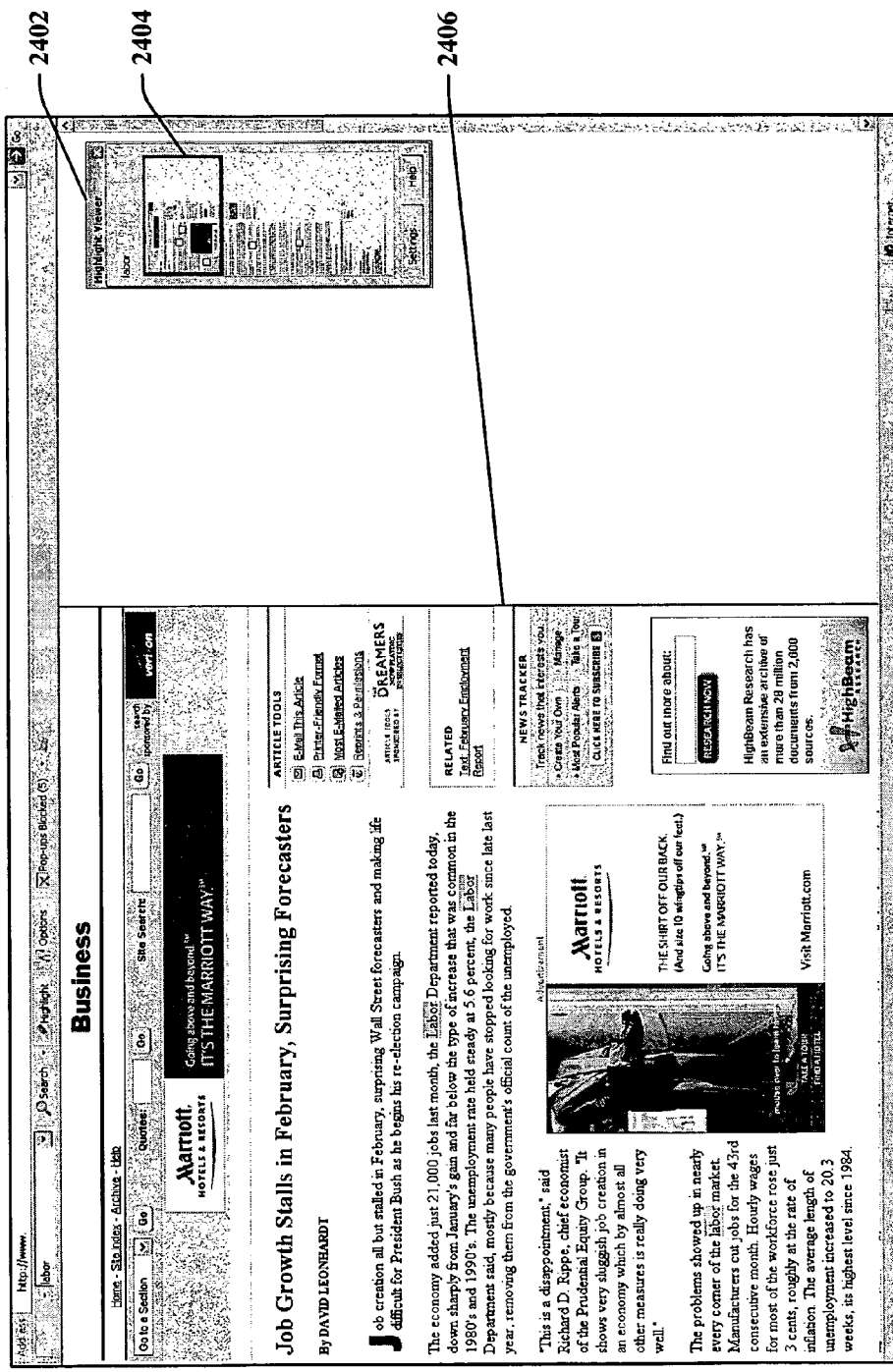
FIG. 24 is a screen shot illustrating a thumbnail view that is part of a toolbar application for an enhanced search query results user interface in accordance with an aspect of the present invention.

Looking at FIG. 24, a screen shot illustrating a thumbnail view that is part of a toolbar application for an enhanced search query results user interface 2400 in accordance with an aspect of the present invention is depicted. In this instance of the present invention, a thumbnail view 2402 is shown as part of a toolbar application. It 2402 includes a thumbnail view selection window 2404 which illustrates within the thumbnail view 2402 a portion of a page 2406 that is displayed. Similar functionality such as automatic scrolling, relevancy indications, and density indications and the like described supra are also incorporated into this instance of the present invention. The toolbar application allows users to position the thumbnail view 2402 in any desirable position to facilitate ease of use.

Figure 25:
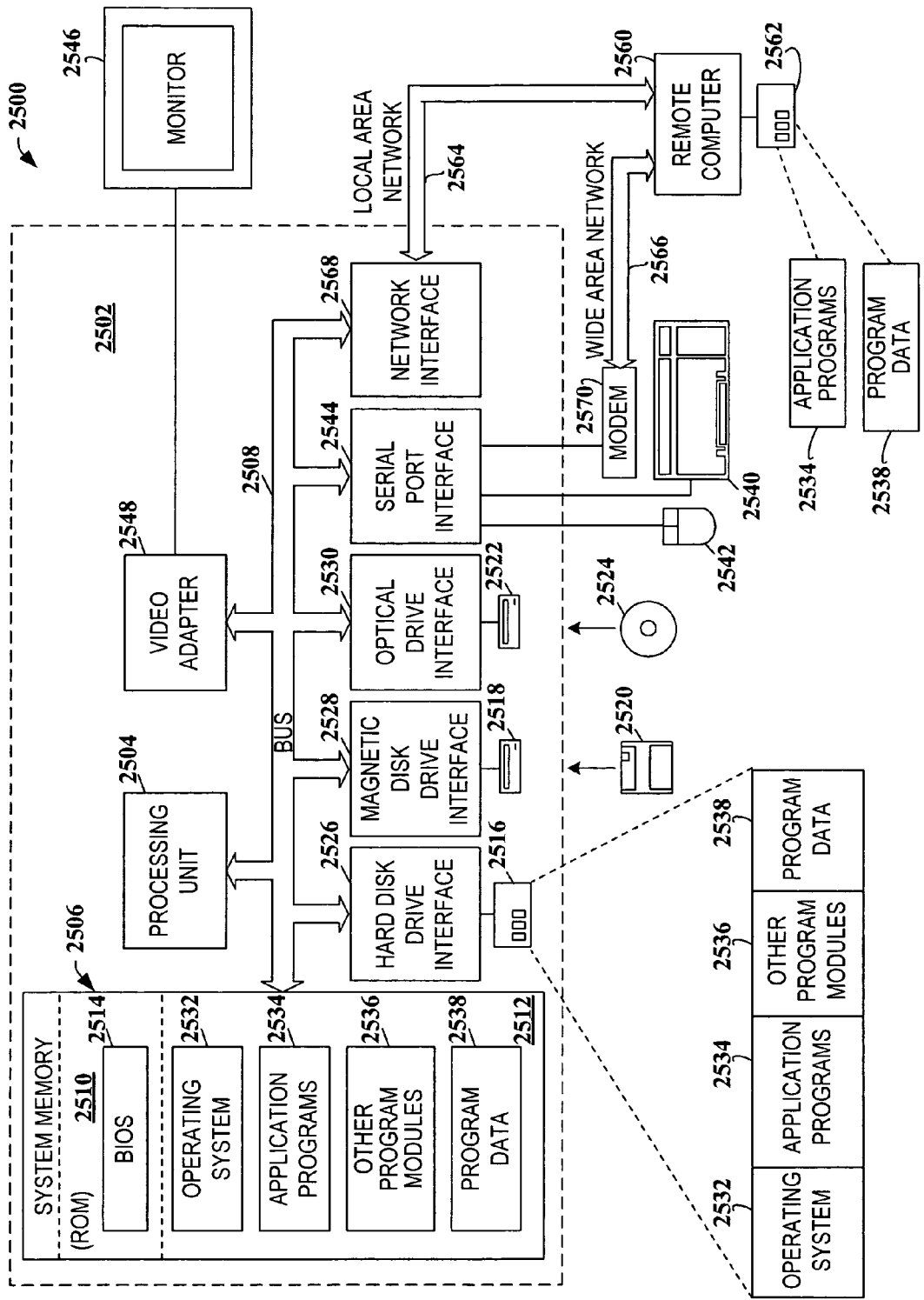
FIG. 25 illustrates an example operating environment in which the present invention can function.

In order to provide additional context for implementing various aspects of the present invention, FIG. 25 and the following discussion is intended to provide a brief, general description of a suitable computing environment 2500 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 25, an exemplary system environment 2500 for implementing the various aspects of the invention includes a conventional computer 2502, including a processing unit 2504, a system memory 2506, and a system bus 2508 that couples various system components, including the system memory, to the processing unit 2504. The processing unit 2504 may be any commercially available or proprietary processor. In addition, the processing unit may be implemented as multi-processor formed of more than one processor, such as may be connected in parallel.

The system bus 2508 may be any of several types of bus structure including a memory bus or memory controller, a peripheral bus, and a local bus using any of a variety of conventional bus architectures such as PCI, VESA, Microchannel, ISA, and EISA, to name a few. The system memory 2506 includes read only memory (ROM) 2510 and random access memory (RAM) 2512. A basic input/output system (BIOS) 2514, containing the basic routines that help to transfer information between elements within the computer 2502, such as during start-up, is stored in ROM 2510.

The computer 2502 also may include, for example, a hard disk drive 2516, a magnetic disk drive 2518, e.g., to read from or write to a removable disk 2520, and an optical disk drive 2522, e.g., for reading from or writing to a CD-ROM disk 2524 or other optical media. The hard disk drive 2516, magnetic disk drive 2518, and optical disk drive 2522 are connected to the system bus 2508 by a hard disk drive interface 2526, a magnetic disk drive interface 2528, and an optical drive interface 2530, respectively. The drives 2516-2522 and their associated computer-readable media provide nonvolatile storage of data, data structures, computer-executable instructions, etc. for the computer 2502. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 2500, and further that any such media may contain computer-executable instructions for performing the methods of the present invention.

A number of program modules may be stored in the drives 2516-2522 and RAM 2512, including an operating system 2532, one or more application programs 2534, other program modules 2536, and program data 2538. The operating system 2532 may be any suitable operating system or combination of operating systems. By way of example, the application programs 2534 and program modules 2536 can include a user-dependent search query result scheme in accordance with an aspect of the present invention.

A user can enter commands and information into the computer 2502 through one or more user input devices, such as a keyboard 2540 and a pointing device (e.g., a mouse 2542). Other input devices (not shown) may include a microphone, a joystick, a game pad, a satellite dish, wireless remote, a scanner, or the like. These and other input devices are often connected to the processing unit 2504 through a serial port interface 2544 that is coupled to the system bus 2508, but may be connected by other interfaces, such as a parallel port, a game port or a universal serial bus (USB). A monitor 2546 or other type of display device is also connected to the system bus 2508 via an interface, such as a video adapter 2548. In addition to the monitor 2546, the computer 2502 may include other peripheral output devices (not shown), such as speakers, printers, etc.

It is to be appreciated that the computer 2502 can operate in a networked environment using logical connections to one or more remote computers 2560. The remote computer 2560 may be a workstation, a server computer, a router, a peer device or other common network node, and typically includes many or all of the elements described relative to the computer 2502, although, for purposes of brevity, only a memory storage device 2562 is illustrated in FIG. 25. The logical connections depicted in FIG. 25 can include a local area network (LAN) 2564 and a wide area network (WAN) 2566. Such networking environments are commonplace in offices, enterprise-wide computer networks, intranets and the Internet.

When used in a LAN networking environment, for example, the computer 2502 is connected to the local network 2564 through a network interface or adapter 2568. When used in a WAN networking environment, the computer 2502 typically includes a modem (e.g., telephone, DSL, cable, etc.) 2570, or is connected to a communications server on the LAN, or has other means for establishing communications over the WAN 2566, such as the Internet. The modem 2570, which can be internal or external relative to the computer 2502, is connected to the system bus 2508 via the serial port interface 2544. In a networked environment, program modules (including application programs 2534) and/or program data 2538 can be stored in the remote memory storage device 2562. It will be appreciated that the network connections shown are exemplary and other means (e.g., wired or wireless) of establishing a communications link between the computers 2502 and 2560 can be used when carrying out an aspect of the present invention.

In accordance with the practices of persons skilled in the art of computer programming, the present invention has been described with reference to acts and symbolic representations of operations that are performed by a computer, such as the computer 2502 or remote computer 2560, unless otherwise indicated. Such acts and operations are sometimes referred to as being computer-executed. It will be appreciated that the acts and symbolically represented operations include the manipulation by the processing unit 2504 of electrical signals representing data bits which causes a resulting transformation or reduction of the electrical signal representation, and the maintenance of data bits at memory locations in the memory system (including the system memory 2506, hard drive 2516, floppy disks 2520, CD-ROM 2524, and remote memory 2562) to thereby reconfigure or otherwise alter the computer system's operation, as well as other processing of signals. The memory locations where such data bits are maintained are physical locations that have particular electrical, magnetic, or optical properties corresponding to the data bits.

Figure 26:
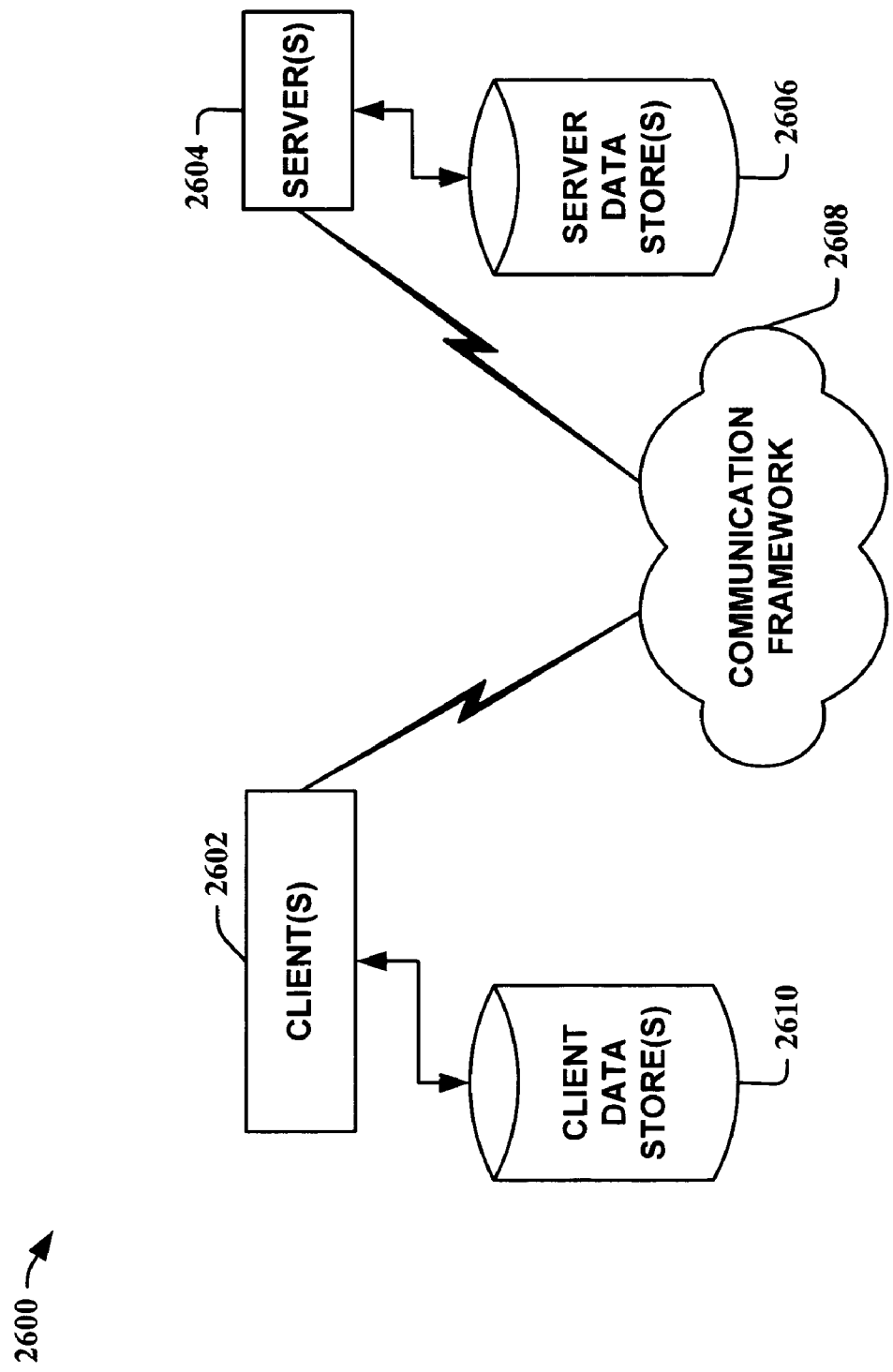
FIG. 26 illustrates another example operating environment in which the present invention can function.

FIG. 26 is another block diagram of a sample computing environment 2600 with which the present invention can interact. The system 2600 further illustrates a system that includes one or more client(s) 2602. The client(s) 2602 can be hardware and/or software (e.g., threads, processes, computing devices). The system 2600 also includes one or more server(s) 2604. The server(s) 2604 can also be hardware and/or software (e.g., threads, processes, computing devices). The server(s) 2604 can house threads to perform transformations by employing the present invention, for example. One possible communication between a client 2602 and a server 2604 may be in the form of a data packet adapted to be transmitted between two or more computer processes. The system 2600 includes a communication framework 2608 that can be employed to facilitate communications between the client(s) 2602 and the server(s) 2604. The client(s) 2602 are connected to one or more client data store(s) 2610 that can be employed to store information local to the client(s) 2602. Similarly, the server(s) 2604 are connected to one or more server data store(s) 2606 that can be employed to store information local to the server(s) 2604.

In one instance of the present invention, a data packet transmitted, between two or more computer components, that facilitates search query results is comprised of, at least in part, information relating to a client-side search query system that utilizes, at least in part, user-related information to provide user-dependent query result data derived from a server query result.

It is to be appreciated that the systems and/or methods of the present invention can be utilized in user-dependent search query result facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates search query results, comprising:
    a processor;
    a memory communicatively coupled to the processor, the memory having-stored therein, computer-executable instructions to implement the system, including:
        a client-side receiving component that accepts at least one query result from at least one search service; and
        a client-side processing component that provides user-dependent query-result information derived from the query result accepted by the client-side receiving component and provides the user-dependent query result information via at least one visual indicator, wherein the at least one visual indicator comprising at least one of highlighting, color, intensity of color, geometric shape, or quantity of geometric shapes, and wherein the user-dependent query-result information includes one or more of the following:
        (a) an indication of percentage of a total quantity of image content within at least one linked document in the query result compared to a total quantity of all content within the at least one linked document in the query result, wherein the at least one linked document is eliminated from the query result when the percentage of the total quantity of the image content within the at least one linked document does not surpass a threshold, or
        (b) an indication of percentage of a total quantity of text content within the at least one linked document in the query result as compared to a total quantity of all content within the at least one linked document in the query result, wherein the at least one linked document is eliminated from the query result when the percentage of the total quantity of the text content within the at least one linked document does not surpass a threshold.

2. The system of claim 1, the user-dependent query result information comprising query result information derived from a user model.

3. The system of claim 2, the user model comprising a model that utilizes, at least in part, information related to at least one of a user context, a user profile, or a user query result rule.

4. The system of claim 1, the client-side processing component provides the user-dependent query result information via at least one aural indicator.

5. The system of claim 1, the client-side processing component derives the user-dependent query result information via evaluation of at least one link provided by the query result.

6. The system of claim 5, the evaluation of at least one link comprising a determination as to whether the link corresponds to at least one of a document with text or a document with links.

7. The system of claim 1, the user-dependent query result information further includes an indication of percentage of the quantity of links within the at least one linked document in the query result as compared to a total quantity of all content within the at least one linked document in the query result.

\* \* \* \* \*